United States Patent [19]
Sullivan

[11] Patent Number: 5,539,446
[45] Date of Patent: Jul. 23, 1996

[54] LIGHT BEAM POSITION DETECTION AND CONTROL APPARATUS EMPLOYING DIFFRACTION PATTERNS

[75] Inventor: Paul F. Sullivan, Westwood, Mass.

[73] Assignee: Polaroid Corporation, Cambridge, Mass.

[21] Appl. No.: 201,256

[22] Filed: Feb. 24, 1994

Related U.S. Application Data

[63] Continuation-in-part of Ser. No. 776,565, Oct. 15, 1991, Pat. No. 5,307,090.

[51] Int. Cl.[6] ................................................. B41J 15/16
[52] U.S. Cl. .......................................... 347/262; 346/135.1
[58] Field of Search .................................. 347/262, 264, 347/153; 346/135.1

[56] References Cited

U.S. PATENT DOCUMENTS

| | | | |
|---|---|---|---|
| 3,812,371 | 5/1974 | Chin | 346/108 X |
| 3,835,249 | 9/1974 | Dattilo et al. | |
| 4,213,704 | 7/1980 | Burns et al. | 356/356 X |
| 4,310,227 | 1/1982 | Zinchuk | 354/25 |
| 4,497,007 | 1/1985 | Greiner et al. | 346/74.2 |
| 4,528,448 | 7/1985 | Doggett | 250/237 G |
| 4,829,342 | 5/1989 | Nishimura | 356/354 |
| 4,841,137 | 6/1989 | Mochizuki et al. | 346/108 X |
| 4,868,385 | 9/1989 | Nishimura | 250/231 |
| 4,950,891 | 8/1990 | Matsui | 250/237 G |
| 4,952,946 | 8/1990 | Clark et al. | 346/108 |
| 4,985,624 | 1/1991 | Spillman | 250/237 G |
| 5,000,572 | 3/1991 | Nose et al. | 356/356 |
| 5,021,649 | 6/1991 | Nishimura et al. | 250/231 |
| 5,036,192 | 7/1991 | Ishizuka et al. | 250/231 |
| 5,038,032 | 8/1991 | Nishimura et al. | 250/231 |
| 5,210,625 | 5/1993 | Moss et al. | 359/1 |

FOREIGN PATENT DOCUMENTS 0060937  9/1982  European Pat. Off. ................. 341/13

OTHER PUBLICATIONS

Canon Laser Linear Encoder Sales Brochure, p. 16.
Canon Laser Rotary Encoder X-1 Super High Resolution Sales Brochure, p. 2.
Canon Laser Rotary Encoder Sales Brochure, p. 14.

Primary Examiner—Mark J. Reinhart
Attorney, Agent, or Firm—Robert A. Sabourin

[57] ABSTRACT

In an electronic image printing apparatus of the type in which a light sensitive image recording layer is exposed by a light beam, an apparatus is provided for determining and controlling the position of the light beam which comprises one or two alternating pluralities of diffraction grating patterns disposed in a corresponding relationship with at least a portion of the light sensitive image recording layer to produce a diffraction grid which when irradiated by the light beam provides a diffracted beam which is representative of the position of the light beam on the diffraction grid. The position of the diffracted beam is detected to provide the requisite signal for controlling the position of the light beam.

56 Claims, 14 Drawing Sheets

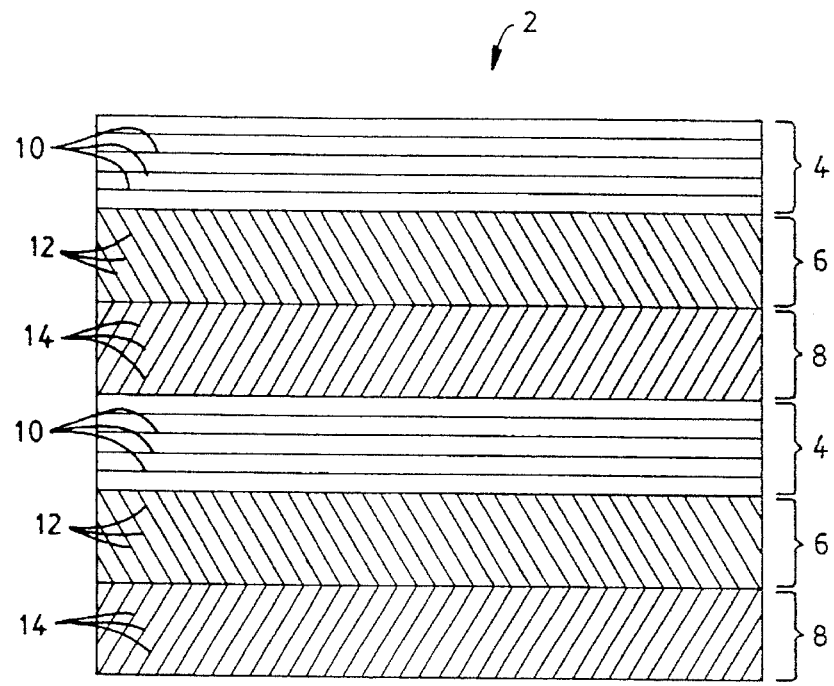
FIG. IA
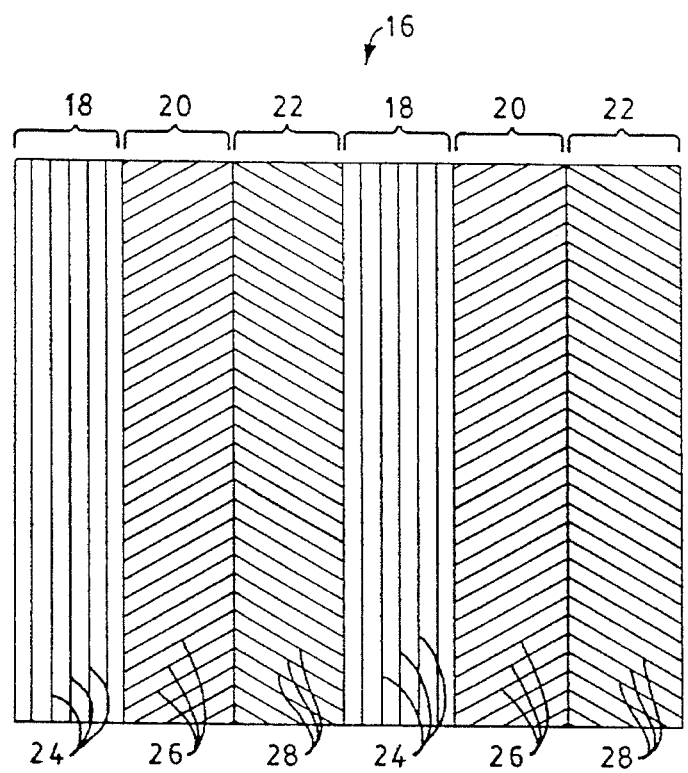
FIG. IB

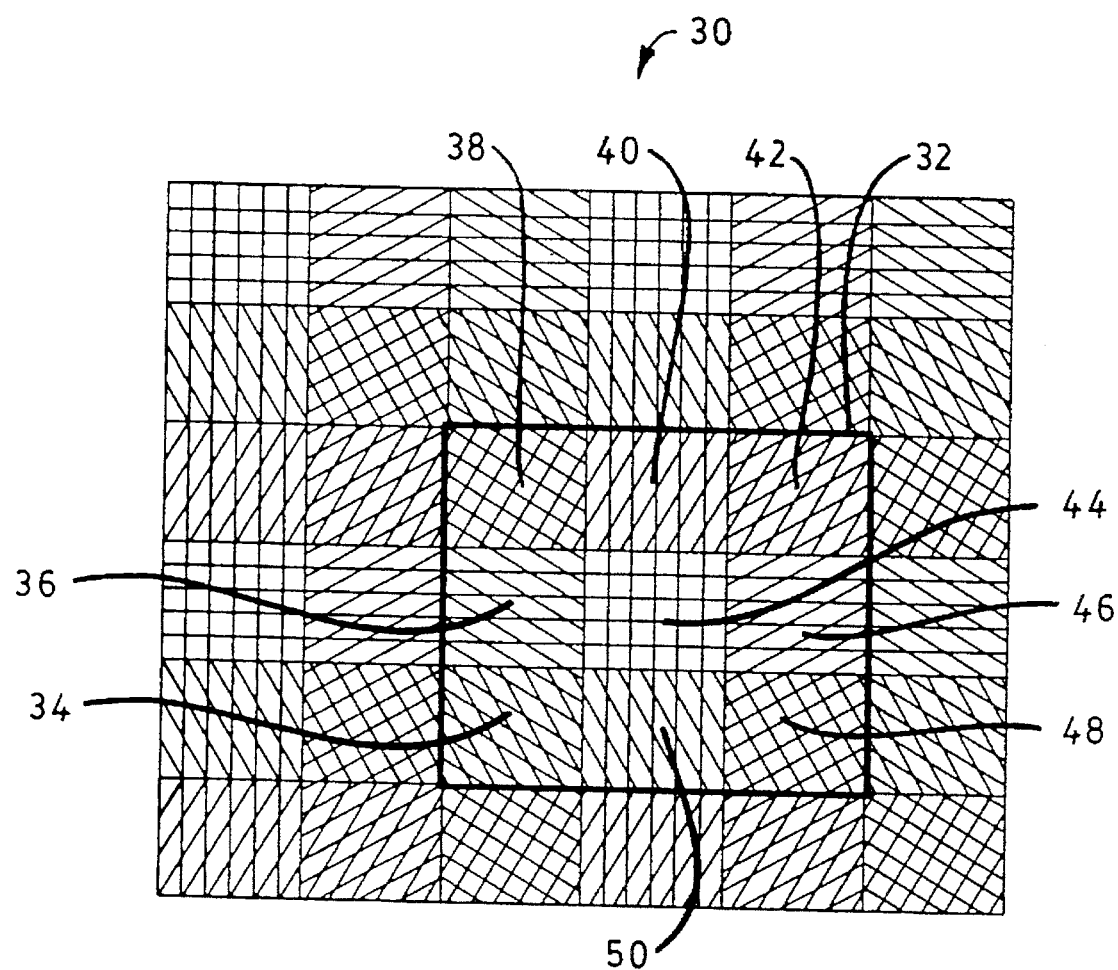
FIG. IC

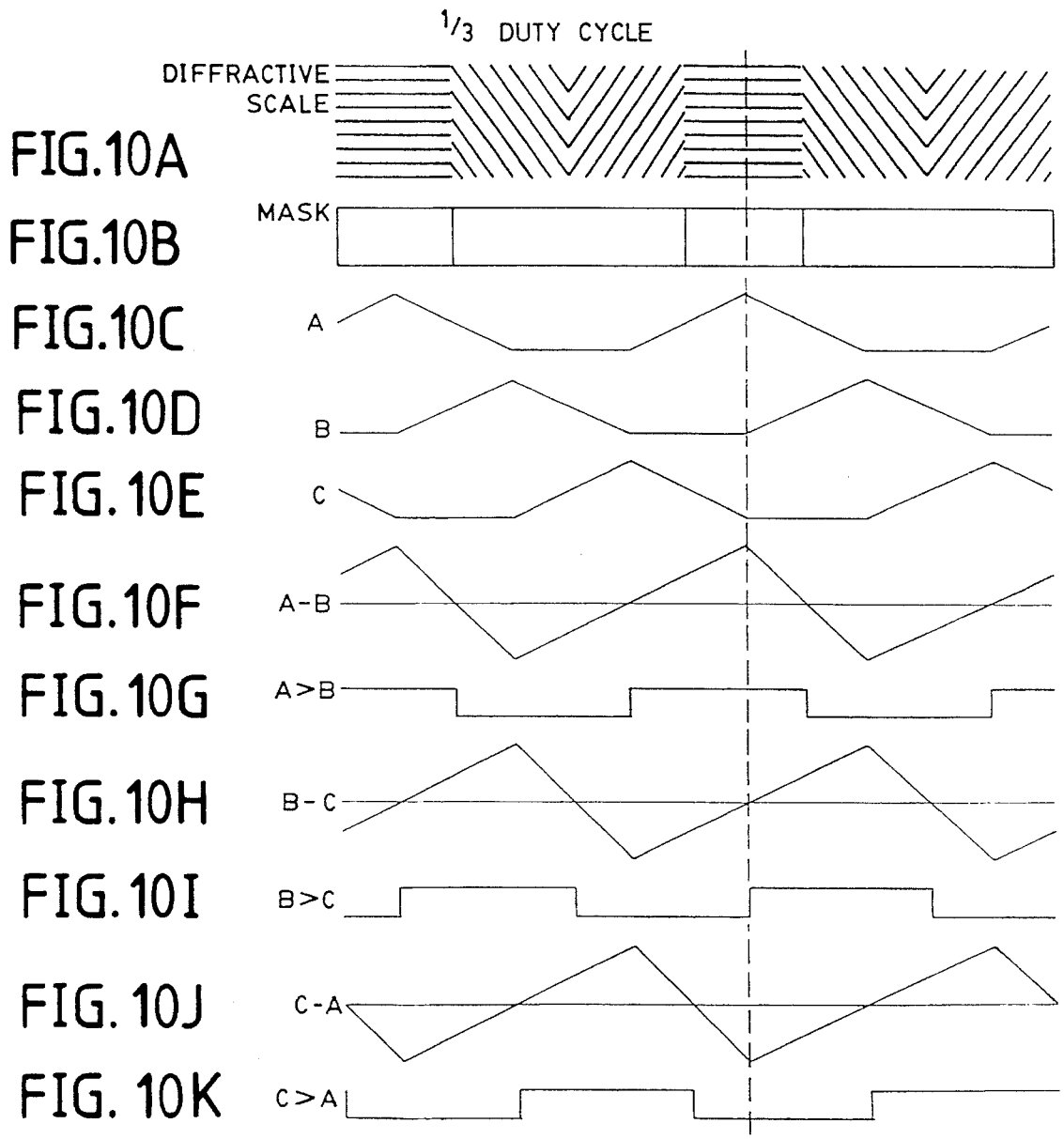

¹/₄ DUTY CYCLE
DIFFRACTIVE SCALE
FIG. 11B  MASK 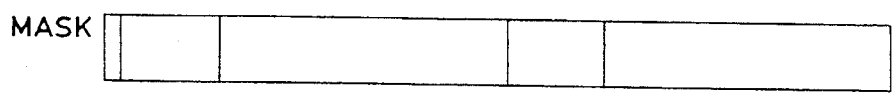
FIG. 11C  A 
FIG. 11D  B 
FIG. 11E  C 
FIG. 11F  A-B 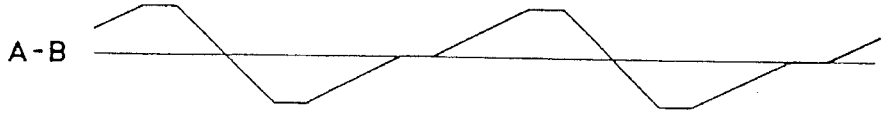
FIG. 11G  A>B 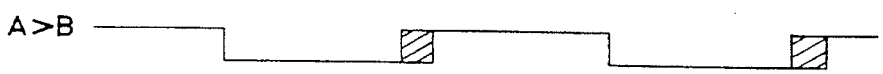
FIG. 11H  B-C 
FIG. 11I  B>C 
FIG. 11J  C-A 
FIG. 11K  C>A 

½ DUTY CYCLE
DIFFRACTIVE SCALE

FIG.12B MASK 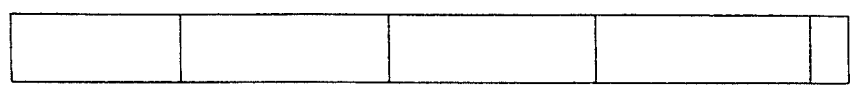
FIG.12C A 
FIG.12D B 
FIG.12E C 
FIG.12F A-B 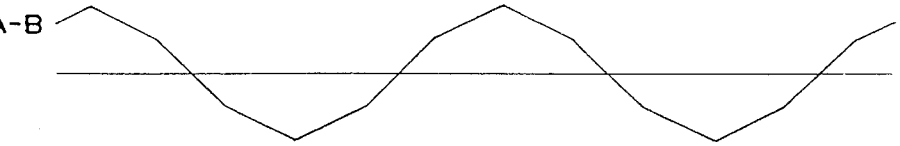
FIG.12G A>B 
FIG.12H B-C 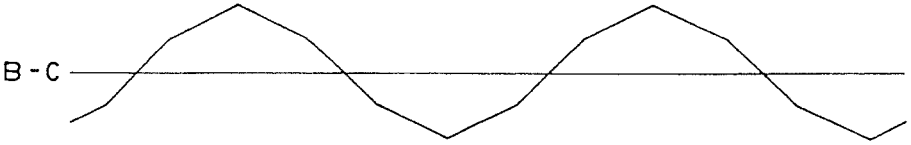
FIG.12I B>C 
FIG.12J C-A 
FIG.12K C>A 

POSITION SIGNAL SELECTIONS

LIGHT BEAM POSITION DETECTION AND CONTROL APPARATUS EMPLOYING DIFFRACTION PATTERNS

RELATED APPLICATION

This application is a continuation-in-part of U.S. patent application Ser. No. 07/776,565 filed 15 Oct. 1991, now U.S. Pat. No. 5,307,090 by Paul F. Sullivan.

FIELD OF THE INVENTION

This invention relates generally to a light beam position detection and control apparatus (hereafter referred to as "PD&C apparatus") for accurately positioning a light beam on a two dimensional surface and, in particular, to a light beam PD&C apparatus which employs the light beam and a continuous encoding scheme to provide two dimensional positional information without substantially effecting the efficiency of the light beam.

BACKGROUND OF THE INVENTION

Presently, research continues on developing apparatus for exposing very high resolution hard copies of electronically recorded images. To produce a high resolution hard copy of an electronically recorded image requires that a very large number of closely spaced physically small pixels be exposed on an image recording medium. A PD&C apparatus must accurately position a writing beam on the image recording medium so that the writing beam precisely exposes, on a pixel by pixel basis, every pixel on the image recording medium. Any mispositioning of the writing beam by the PD&C apparatus could result in the misexposure of pixels which would yield an undesirable hard copy image.

The PD&C apparatus in present imaging systems typically employs a discrete encoding scheme and a second light beam to position a writing beam onto the image recording medium. An example of this approach is disclosed in U.S. Pat. No. 4,952,946 issued to Clark et at. on August 1990 and which is incorporated herein by reference. In this patent, a second light beam, known as either a reference or tracking beam, moves in conjunction with the writing beam. Specifically, this second beam is reflected off an encoding device while the writing beam exposes the underlying image recording medium through a scanning slot located adjacent to and along the encoding device. The encoding device which is either a Fresnel mirror, a holographic encoder, or an alternating plurality of reflective and non reflective areas, transforms the light from the second light beam into modulated pulses and reflects these modulated pulses onto a detector and ultimately to the PD&C apparatus. The change in amplitude of these modulated pulses indicates where on the encoding device the second beam is located and, hence, where the writing beam is located on the image recording medium. Accordingly, from these modulated pulses, the PD&C apparatus controls the energization and/or the modulation of the writing beam.

Although adequate for positioning the writing beam, this approach does have some shortcomings. First, this approach may not provide sufficiently precise positional information regarding where the writing beam is located on the image recording medium because of its inability to precisely locate the reference beam on the encoder. This occurs, typically, because the diameter of the reference beam is substantially smaller than the width of a reflective or non reflective area on the encoder. Thus, although the PD&C apparatus can determine in which reflective or non reflective area the reference beam is located, it cannot determine where within this area the beam is located.

Second, this approach cannot determine the direction in which the writing beam travels on the image recording medium. This occurs because the encoder is comprised of only two different encoding states, namely, reflective and non reflective. Thus, regardless of which direction the reference beam travels on the encoder, the same repeating pattern of modulated pulses will be reflected to the PD&C apparatus.

Third, this approach may be prone to degradation in its ability to accurately position the writing beam onto the image recording medium. Since only the second beam provides the position information regarding the writing beam's location on the image recording medium, a strict positional correlation must exist between the second beam's position on the encoder and the writing beam's position on the image recording medium. This strict positional correlation is maintained by a precisely toleranced mechanical connection between those elements that make up the writing beam and those elements that make up the second beam. However, with prolonged use, this mechanical connection could degrade and correspondingly adversely effect the positioning of the writing beam on the image recording medium.

Fourth, this approach is also inappropriate for PD&C apparatus which employ a writing beam that moves along two orthogonal axes. That is, this approach can only accurately position a writing beam that moves along one axis, but not one that moves along two orthogonal axes. This occurs because the encoder is comprised of only two different encoding states, namely, either reflecting or non reflecting and, in order to provide two dimensional positional information which allows for reverse motion, an encoder must have at least nine different encoding states.

Consequently, for all the above mentioned reasons, a need still exists in the high resolution imaging area for a PD&C apparatus that can quickly yet consistently and accurately expose every very small pixel in an image recording medium in order to produce a high resolution hard copy.

SUMMARY OF THE INVENTION

With the foregoing in mind, the primary object of the present invention is to provide a PD&C apparatus that can accurately and consistently position a writing beam that moves in two orthogonal directions on a surface of an object to be scanned without the need for a pilot or reference beam.

According to the invention, the foregoing object is achieved by employing a diffraction grid that is either disposed integrally over or in a corresponding relationship with at least a portion of a surface to be scanned. This diffraction grid is comprised of either one repeating plurality of different diffraction grating patterns or two pluralities of different diffraction grating patterns in which a first repeating plurality of different diffraction grating patterns is disposed in an overlapping relationship with respect to a second repeating plurality of different diffraction grating patterns. A diffraction grid that employs only the one repeating plurality of different diffraction grating patterns provides accurate position information in one direction only. Conversely, a diffraction grid that employs two pluralities of different diffraction grating patterns provides accurate position information in two orthogonal directions.

In a diffraction grid that employs only one repeating plurality of different diffraction grating patterns, the diffraction grid is comprised of a repeating plurality of three different diffraction grating areas arranged in a side by side relationship with respect to each other in at least one row or column which is disposed in a corresponding relationship with the face of the surface to be scanned. The width of three adjacent diffraction grating patterns defines a coarse pitch of the diffraction grid. Each diffraction grating pattern is comprised of a plurality of equidistant, parallel, and straight lines and the center to center spacing of these adjacent parallel lines defines a fine pitch of the diffraction grid. The center to center spacing of adjacent parallel lines in adjacent diffraction grating patterns is substantially similar. However, the parallel lines in adjacent diffraction grating patterns are rotated approximately 30 or 60 degrees with respect to each other. As the center of the light beam of the correct radius, i.e., at least twice the fine pitch but less than ten times the coarse pitch of the diffraction grid, transversely moves from one diffraction grating pattern to another different diffraction grating pattern, the diffraction grid will produce a diffracted beam which is representative of the location of the light beam on the diffraction grid. However, for that portion of light beam that moves parallel along the same diffraction grating pattern, the diffraction grid will produce the diffracted beam, but it will not provide any information regarding the light beam's position on that specific diffraction grating pattern.

In a diffraction grid that employs two different repeating pluralities of different diffraction grating patterns, each repeating plurality of different diffraction grating patterns is comprised of typically three different diffraction grating patterns disposed in an adjacent relationship. Each individual diffraction grating pattern is physically the same as those discussed in the paragraph above. However, a first repeating plurality of different diffraction grating patterns is disposed in an overlapping relationship with respect to a second repeating plurality of diffraction grating patterns to create a repeating plurality of cells arranged in a side by side relationship with respect to each other. Each cell is comprised of a plurality of different composite diffraction grating patterns. Each composite diffraction grating pattern is defined as the intersection of a diffraction grating pattern from the first repeating plurality of different diffraction grating patterns and a diffraction grating pattern from the second repeating plurality of different diffraction grating patterns. The fine pitch of such a two dimensional diffraction grid is the same as in the one dimensional diffraction grid, namely, the center to center spacing of adjacent parallel lines while the coarse pitch is defined as the longest side dimension of a cell. As the center of the light beam of the correct radius, i.e., at least twice the fine pitch but less than ten times the coarse pitch of the diffraction grid, moves from one composite diffraction grating pattern to another composite diffraction grating pattern, the diffraction grid will produce a diffracted beam which is representative of the location of the light beam on the diffraction grid.

The diffraction grids discussed above are preferably employed in the manner of this invention for determining the position of a light beam on a surface to be scanned, such as a linear or rotary encoder, and may be part of an electronic image printing apparatus for scanning an image exposing light beam across the face of an image recording medium. The printing apparatus may include a diffraction grid, as discussed above, disposed either integrally over the surface to be scanned or in a diffraction mask disposed in a corresponding relationship with at least a portion of the surface to be scanned. A light source radiates a light beam onto either the diffraction mask or onto the diffraction grid and a diffracted beam is diffracted therefrom which is representative of the position of the light beam on the diffraction mask or the diffraction grid, respectively. A detection means then detects the diffracted beam and produces a control signal indicative of the light beam position on either the diffraction mask or the diffraction grid. A scanning means receives the control signal and effects the scanning of the light source relative to the surface to be scanned dependant on the control signal received. This process of diffracting light, sensing the diffracted light, and then scanning the light source continues until all the pixels or pels have been properly exposed.

The printing apparatus may also employ an aperture mask to provide an advantageous patterned light beam. This aperture mask may be disposed either between the light source and the diffraction mask or between the diffraction mask and the surface to be scanned but, in either case, the aperture mask is always disposed an integer multiple of a Talbot distance away from the diffraction mask. When employed with a two dimensional diffraction grid that comprises two repeating pluralities of different diffraction grating patterns arranged, the aperture mask comprises a plurality of spaced apart apertures. Each aperture in the aperture mask corresponds to a specific composite diffraction grating pattern in each cell and each aperture has approximately the dimensions necessary to produce a light beam on the diffraction grid having approximately the dimensions of the specific composite diffraction pattern. When employed with a one dimensional diffraction grid that comprises only one repeating plurality of different diffraction grating patterns, the aperture mask comprises a single elongated aperture or a plurality of spaced apart rows or columns of elongated apertures. Each elongated aperture is substantially longer than wide and as wide as necessary to produce a light beam on the diffraction mask having approximately the width dimension of a diffraction grating area. The center to center spacing between the elongated apertures is also as wide as the width dimension of either two, five, or eight adjacent diffraction grating patterns.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 1A is a one dimensional diffraction grid according to the teachings of this invention which provides positional information along the vertical axis;

FIG. 1B is the one dimensional diffraction grid of FIG. 1A rotated by 90 degrees to provide positional information along the horizontal axis;

FIG. 1C is the superposition of the diffraction grids shown in FIGS. 1A and 1B to provide a two dimensional diffraction grid which provides positional information along both the vertical axis and the horizontal axis;

FIG. 10 graphically displays a one third duty cycle of the mask;

DESCRIPTION OF THE PREFERRED EMBODIMENTS

Figure 2:
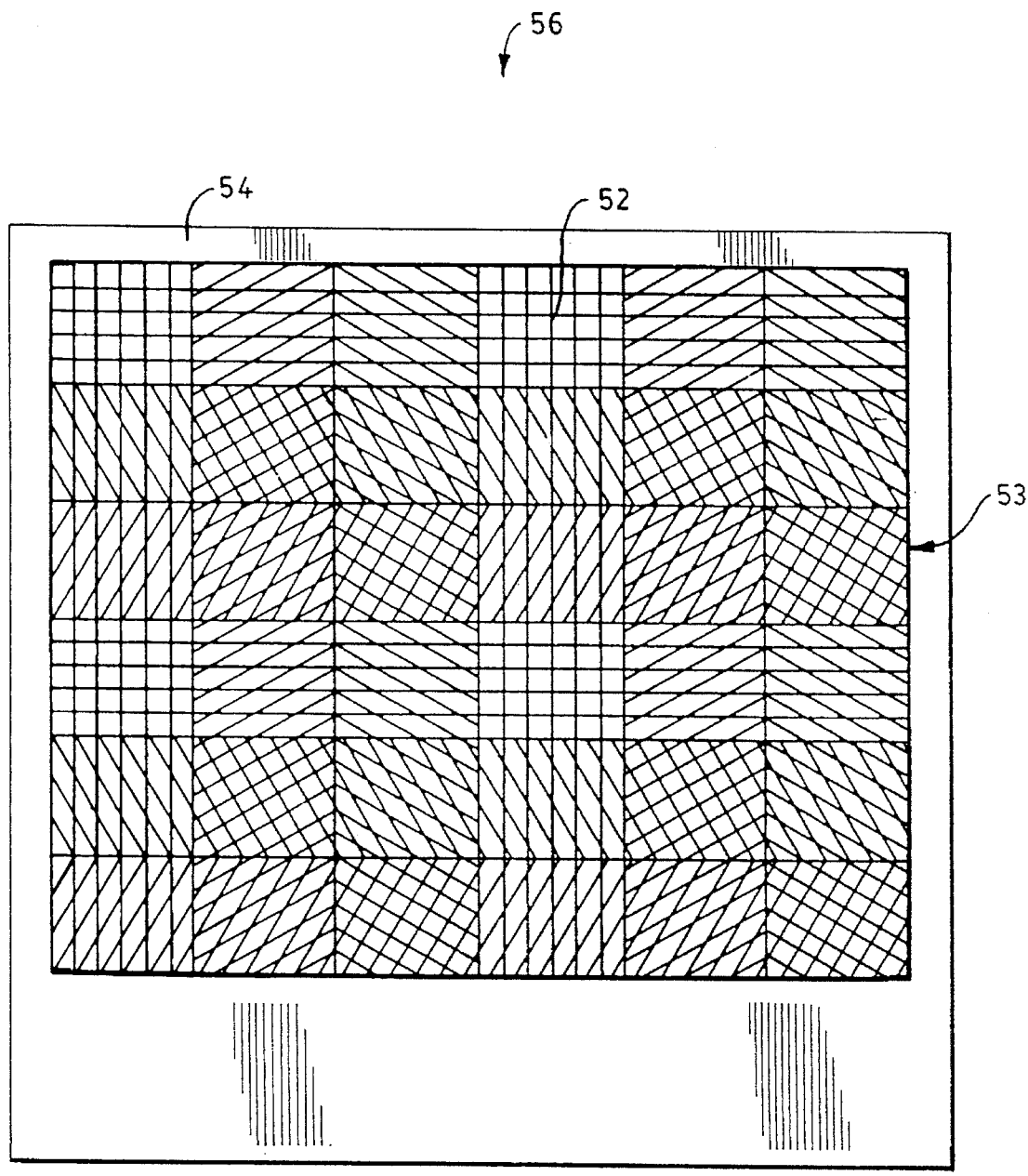
FIG. 2 is the two dimensional diffraction grid shown in FIG. 1C superimposed on the top surface of image recording medium of an instant photograph and as seen along line 2—2 in FIG. 3.

FIG. 1A shows generally a diffraction grid 2 that provides accurate position information only along the vertical axis on a light beam (not shown) that travels anywhere on the grid. The diffraction grid 2, also known as a one dimensional diffraction grid, is comprised of a repeating plurality of three different diffraction grating patterns 4, 6, and 8, respectively, that are arranged in a side by side relationship with respect to each other. The three different diffraction grating patterns in the diffraction grid 2 are disposed in an adjacent relationship with respect to each other and the width of three adjacent diffraction grating patterns defines a coarse pitch of the diffraction grid 2. Each diffraction grating pattern itself is further comprised of a plurality of equidistant, parallel, and straight lines 10, 12, and 14, respectively, and the center to center spacing of these parallel lines defines a fine pitch of the diffraction grid 2. The center to center spacing of parallel lines in adjacent diffraction pattern gratings is substantially the same; however, the parallel lines in adjacent diffraction grating patterns are rotated approximately 30 or 60 degrees with respect to each other. When a center of a light beam (not shown) having the correct radius ("correct radius" hereafter being defined as equal to at least twice the fine pitch but not more than ten times the coarse pitch of this diffraction grid) moves along the vertical axis, the diffraction grid 2 will produce a different diffracted beam (not shown) for each different diffraction grating pattern that the light beam (not shown) travels through. This alternating series of three different diffracted beams is representative of the location of the light beam on this diffraction grid 2. Conversely, when the center of the light beam (not shown) moves along the horizontal axis only in the same diffraction grating pattern, the diffraction grid 2 will produce the same diffracted beam (not shown), however, it will not provide any information regarding the change in position of the light beam on that diffraction pattern.

FIG. 1B shows another one dimensional diffraction grid 16 which is substantially similar to the one shown in FIG. 1A and which provides accurate position information only along the horizontal axis on a light beam (not shown) that travels anywhere on the grid. This diffraction grid 16 is comprised of a repeating plurality of three different diffraction grating patterns 18, 20, and 22, respectively, that are arranged in a side by side relationship with respect to each other. The three different diffraction grating patterns are disposed in an adjacent relationship and the width of the three adjacent diffraction grating patterns defines a coarse pitch of the diffraction grid 16. Each diffraction grating pattern itself is further comprised of a plurality of equidistant, parallel, and straight lines 24, 26, and 28, respectively, and the center to center spacing of these parallel lines defines a fine pitch of the diffraction grid 16. The center to center spacing of parallel lines in adjacent diffraction grating patterns is substantially the same; however, the parallel lines in adjacent diffraction grating patterns are rotated approximately 30 or 60 degrees with respect to each other. When a center of a light beam (not shown) having the correct radius moves along the horizontal axis, the diffraction grid 16 will produce a different diffracted beam (not shown) for each different diffraction grating pattern the light beam (not shown) travels through. This alternating series of three different diffracted beams is representative of the location of the light beam on the diffraction grid 16. Conversely, when the center of the light beam (not shown) moves along the vertical axis only along the same diffraction grating pattern, the diffraction grid 16 will produce the same diffracted beam (not shown), however, it will not provide any information regarding the change in position of the light beam on that diffraction pattern.

FIG. 1C shows a two dimensional diffraction grid 30 which is the superposition of the diffraction grid 2 in FIG. 1A over the diffraction grid 16 in FIG. 1B. Specifically, this two dimensional diffraction grid 30 is comprised of a first repeating plurality of different diffraction grating patterns 4, 6, and 8 (FIG. 1A) that make up the diffraction grid 2 disposed in an overlapping relationship with respect to a second repeating plurality of different diffraction grating patterns 18, 20, and 22 (FIG. 1B) that make up the diffraction grid 16. The diffraction grid 30 provides accurate position information on a light beam (not shown) that travels in both the horizontal and the vertical axes. As shown in FIG. 1C, the diffraction grid 30 is comprised of a repeating plurality of square shaped areas, each area hereafter referred to as a cell 32, which are arranged in a side by side relationship with respect to one another. Each cell 32 is comprised of a plurality of different composite diffraction grating patterns wherein each composite diffraction grating pattern is defined as the intersection of a diffraction grating pattern from the first repeating plurality and a diffraction grating pattern from the second repeating plurality. The number of different composite diffraction grating patterns in each cell depends on the number of different diffraction grating patterns in the first repeating plurality and in the second repeating plurality. That is, the number of different composite diffraction grating patterns is the product of the number of different diffraction grating patterns in the first repeating plurality and the number of different diffraction grating patterns in the second repeating plurality. As shown in FIG. 1C, there are nine different composite diffraction grating patterns 34, 36, 38, 40, 42, 44, 46, 48, and 50, respectively, that are disposed in each cell 32 which also means that the first and second repeating plurality each has three different diffraction grating patterns. These nine different composite diffraction patterns are repeated respectively in all the cells as discussed above so as to make up the diffraction grid 30.

The shape of each cell 32 is determined by the coarse pitches of the underlying diffraction grids 2 and 16. If the coarse pitches of the diffraction grids 2 and 16 are the same, a square shaped cell results while, if the coarse pitches of these diffraction grids 2 and 16 are different, a rectangular shaped cell results. The fine pitch of the diffraction grid 30 is determined the same way as in FIGS. 1A and 1B, namely, by the center to center spacing of adjacent parallel lines. For a square shaped cell, the coarse pitch is defined as the longest side dimension of the cell while, for a rectangular shaped cell, the coarse pitch is defined as the longest side dimension of either the width or the length of the cell.

Since the composite diffraction grating pattern in any given cell is different from any other composite diffraction grating pattern found in the given cell, a center of a light beam (not shown) of the correct radius that travels from one composite diffraction grating pattern to an adjacent composite diffraction grating pattern will always produce a diffracted beam that differs from the preceding diffracted beam. In essence, this feature encodes the present relative position of the light beam (not shown) on the diffraction grid 32 within the current diffracted beam (not shown).

It should also be noted that several discrete light beam radii exist within the correct radii defined above for which the diffraction grids as described in FIGS. 1A, 1B, and 1C will not provide any positional information regardless of which direction the light beam moves. These light beam radii are typically, although not exclusively, exact integer multiples of the coarse pitch of the diffraction grids.

FIG. 2 shows the two dimensional diffraction grid 52 of FIG. 1C (not to scale) disposed within a border 54 of an instant photograph 56 and over an undeveloped image recording layer 53. Overlying the image recording layer 53, there is provided an approximately 76 microns thick layer of poly(ethylene terephthalate) (not shown) coated with an approximately 13 micron thick layer of cellulose acetate butyrate (not shown) which is embossed with the diffraction grating patterns that make up this diffraction grid 52. The diffraction grid 52 is disposed on the image recording layer 53 so that a light beam (not shown) can be accurately positioned to expose a recorded image onto the image recording layer 53. The coarse pitch of the diffraction grid 52 is between 50 and 150 microns while the individual straight and parallel lines that make each different diffraction grating pattern are between 1 and 5 microns wide and have a fine pitch of between 2 and 10 microns. Since (a) the spatial density of the fine pitch of the diffraction grid 52 typically falls outside of the sensitivity range of the human visual system and (b) the pattern is a texture rather than a pigment, the diffraction grid 52 remains invisible to the unaided human visual system regardless of whether the image recording layer is exposed or unexposed.

Figure 3:
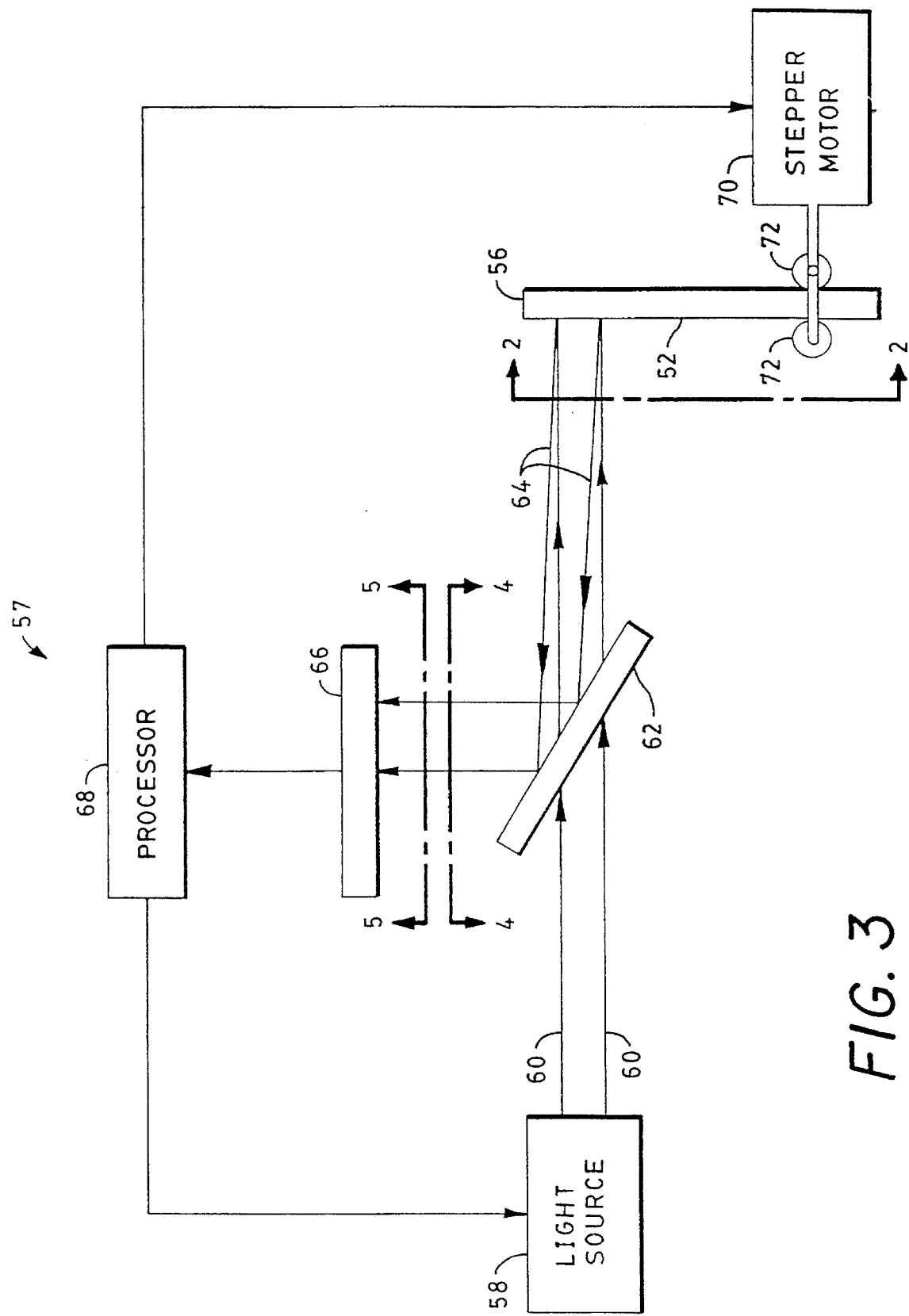
FIG. 3 is a first PD&C apparatus according to the teachings of this invention.

FIG. 3 shows a first embodiment of a PD&C apparatus 57 that employs a diffraction grid according to this invention that is mounted directly onto the image recording medium. Specifically, a light source 58 produces a light beam 60 which travels through a beam splitter 62 and onto an instant photograph 56. The instant photograph 56 is of the type as discussed above in conjunction with FIG. 2 that has a diffraction grid 52 disposed over the image recording layer. The light beam 60 strikes the diffraction grid 52 and produces a reflected and diffracted beam 64 which then reflects off the beam splitter 62 and onto a sensor 66. The sensor 66 transmits the information contained in the diffracted beam 64, namely, the position of the light beam 60 on the diffraction grid 52, to a processor 68 which controls both a stepper motor 70 and the light source 58. Specifically, the processor 68 controls the stepper motor 70 which drives a pair of rollers 72 which engage the border 54 of the instant photograph 56. The pair of rollers 72 control the vertical movement of the photograph 56. Similarly, the processor 68 also controls the horizontal movement of the photograph 56 relative to the light source 58 so as to correctly expose all the pixels or pels in a given row of the photograph 56. This horizontal movement is accomplished by either (a) horizontally moving the photograph 56 relative to a stationary light source 58 by employing a second stepper motor (not shown) attached to the first stepper motor 70 or (b) horizontally moving the light beam 60 relative to a horizontally stationary photograph 56 by using a mirror (not shown) disposed between the beam splitter 62 and the photograph 56. In either case, the process of diffracting light, sensing the diffracted light, and then moving both the light source and the instant picture continues until all the pixels or pels in all the rows and all the columns have been properly exposed.

Figure 4:
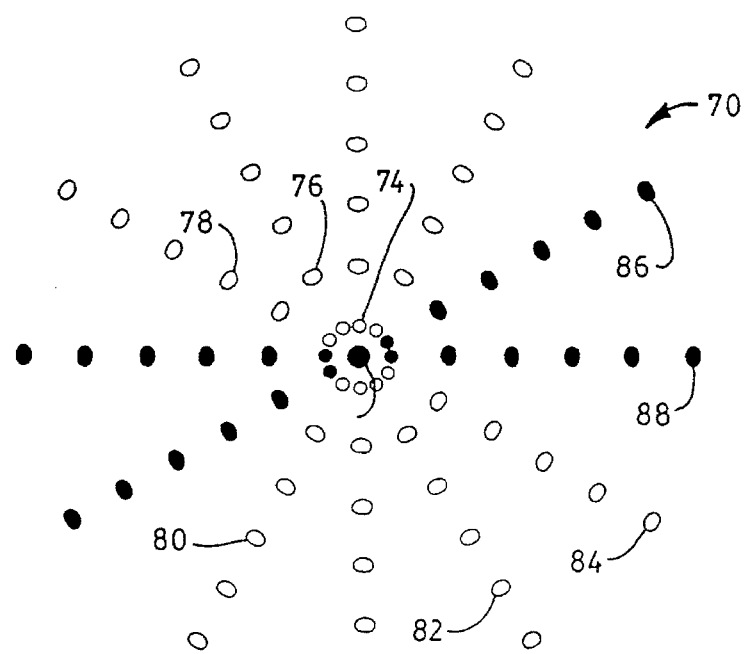
FIG. 4 is a front view of the diffraction pattern produced by the two dimensional diffraction grid disposed on the top surface of the instant photograph as seen along line 4—4.

FIG. 4 shows all the potential diffraction patterns 70 that can be produced by the diffracted beam 64 (FIG. 3) that is diffracted from the two dimensional diffraction grid 52 (FIG. 2). The diffraction patterns 70, as shown, comprise the zeroth diffraction order represented by a central dot 72 and the first, third, fifth, seventh, ninth, and eleventh diffraction orders which are represented by a circular ring of dots 74, 76, 78, 80, 82, and 84, respectively. Even diffraction orders (not shown) produced by the diffraction beam 64 (FIG. 3) are suppressed by the one half fine pitch duty cycle of the diffraction grid. Each diffraction order is sequentially disposed about the central dot 72 with the lowest diffraction order being disposed closest to the central dot 72 and the highest diffraction order being disposed farthest away from the central dot 72. As is well known to one skilled in the art, the highest diffraction order achievable is determined by the fine pitch of the diffraction grid and the wavelength of the light beam. The two lines of darkened dots 86 and 88, respectively, represent a specific diffraction pattern produced by the light beam 60 (FIG. 2) diffracting off a specific composite diffraction grating pattern in the diffraction grid 52 (FIG. 2). As the light beam 60 (FIG. 2) moves from one composite diffraction grating pattern to a different composite diffraction grating pattern, the first pair of lines of darkened dots 86, 88 will fade and a second pair of lines of darkened dots (not shown) will appear. Sequentially, as the light beam 60 (FIG. 2) moves across the diffraction grid 52 (FIG. 2) and across the different composite diffraction grating patterns disposed within a given cell, each line of darkened dots will appear to discretely rotate, as a line, about the central dot 72. By (a) determining the initial position of the light beam 60 (FIG. 3) on the diffraction grid 52 (FIG. 2) and (b) by counting or timing the sequence of the rotation of these lines of darkened dots about the central dot 72, the processor 68 (FIG. 3) can determine the position of the light beam 60 (FIG. 3) on the diffraction grid 52 (FIG. 2) and hence the position of the light beam 60 (FIG. 3) on the instant photograph 56 (FIG. 2). Moreover, by also determining the ratio of the light intensity associated with the first pair of lines of darkened dots 86, 88 to the light intensity associated with the second pair of lines of darkened dots (not shown), the processor 68 (FIG. 3) can also interpolate with a very high resolution the position of the light beam 60 (FIG. 3) on the diffraction grid 52 (FIG. 2). For example, using this interpolation method discussed above and a diffraction grid that has a coarse pitch of 150 microns, the position of a light beam on the diffraction grid can be determined to within 0.1 to 0.2 microns. It should also be noted that in order to use interpolation the diameter of the light beam 60 (FIG. 3) must be at least one third coarse pitch of the diffraction grid.

Figure 5:
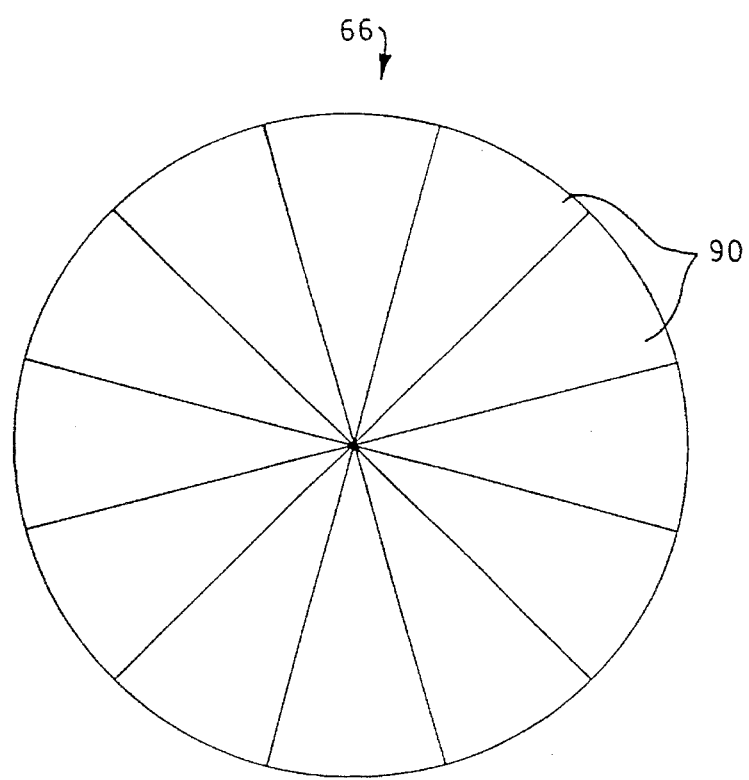
FIG. 5 is a front view of the light detectors as seen along line 5—5 in FIG. 3.

FIG. 5 shows a close up view of the sensor 66 shown in FIG. 3. Specifically, the sensor 66 is comprised of twelve adjacent wedge shaped sensors 90 which collectively cover an entire 360 degree arc. Each sensor 90 covers a 30 degree area and is aligned to sense one half of one line of dots that extends from beyond the central dot 72 out to a dot in the eleventh diffraction order. Alternatively, an array of sensors which intercept only a subset of the diffraction orders may be used.

Figure 6:
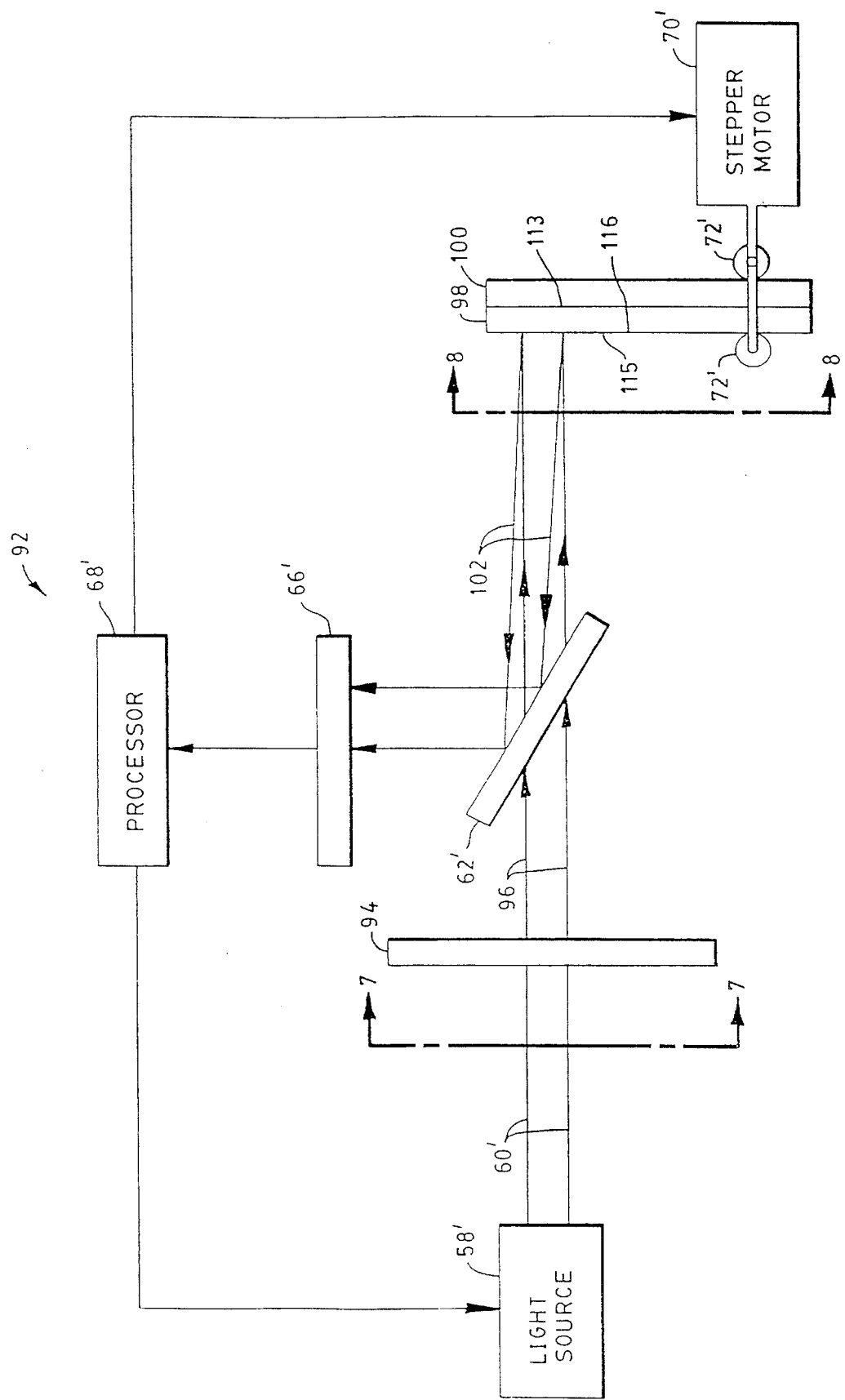
FIG. 6 is a second PD&C apparatus according to the teachings of this invention.

Referring now to FIG. 6 where like numerals designate previously described elements in FIG. 3, a second embodiment of a PD&C apparatus 92 is disclosed that employs a diffraction grid which is integrally attached to the PD&C apparatus 92. Specifically, a light source 58' produces a substantially collimated light beam 60' which travels through an aperture mask 94 to produce a patterned light beam 96 which then travels through a beam splitter 62'. This patterned light beam 96 is irradiated onto both a diffraction mask 98 and onto an image recording medium 100, typically either a reflective photograph or a transmissive slide, which are held in registration by a pair of rollers 72' attached to a stepper motor 70'. The aperture mask 94 is disposed an integer multiple of a Talbot distance away from the diffraction mask 98 so as to take advantage of the Talbot self-imaging property of the aperture mask 94. It is also understood that, if the coarse pitch of the diffraction grid is coarse enough and the distance between the diffraction mask 98 and the aperture mask 94 is small enough, Talbot imaging need not be used in this invention. The diffraction mask 98 comprises a diffraction grid 116 that is typically disposed (a) on one of the major surfaces 113, 115 of the diffraction mask 98 or (b) integrally in the diffraction mask 98 itself. The patterned light beam 96 strikes the diffraction grid 116 which for illustrative purposes of this embodiment only is disposed on the major surface 115 and produces a reflected and diffracted beam 102, reflects off the beam splitter 62', and onto a sensor 66'. The sensor 66' transmits the information contained in the diffracted beam 64', namely, the position of the light beam 64' on the diffraction grid 116, to the processor 68' which controls both the horizontal and vertical movement of the patterned light beam 96 relative to the diffraction mask 98 and the image recording medium 100. Specifically, the processor 68' controls a stepper motor 70' which controls the rollers 72' which engage the borders of both the image recording medium 100 and the diffraction mask 98 and move both the image recording medium 100 and the diffraction mask 98 together vertically relative to the vertically stationary patterned light beam 96. Similarly, the processor 68' also controls the horizontal movement of the patterned light beam 96 relative to the image recording medium 100 either by (a) moving the patterned light beam 96 horizontally across the diffraction mask 98 and image recording medium 100 by means of a mirror (not shown) disposed between the beam splitter 62' and the diffraction mask 98 or by (b) moving the diffraction mask 98 in conjunction with the image recording medium 100 horizontally relative to a stationary patterned light beam 96 by means of a second stepper motor (not shown) attached to stepper motor 70'.

Figure 7A:
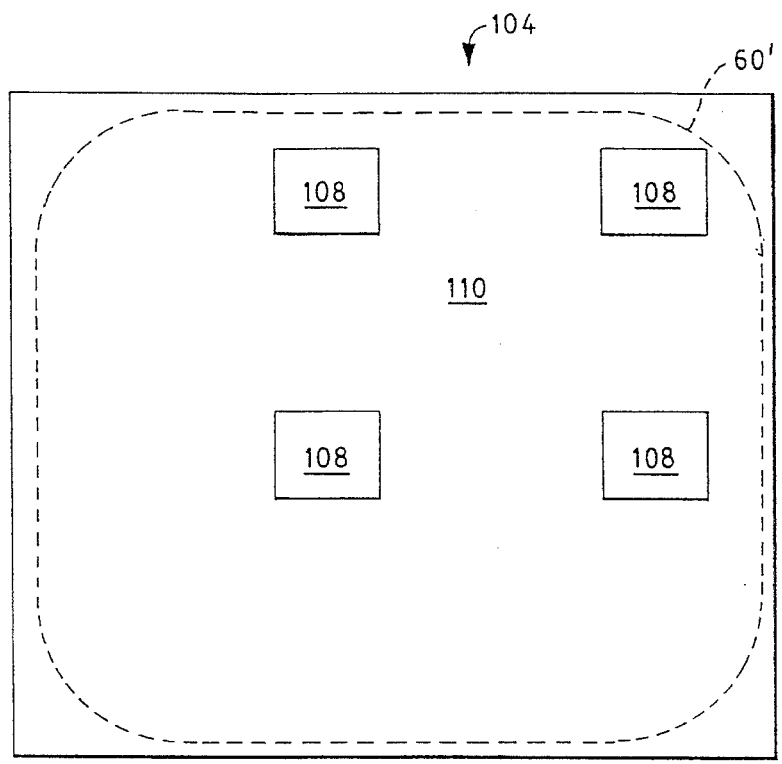
FIG. 7A is a front view of a two dimensional aperture mask according to the teaching of this invention as seen along line 7—7 in FIG. 6.
Figure 7B:
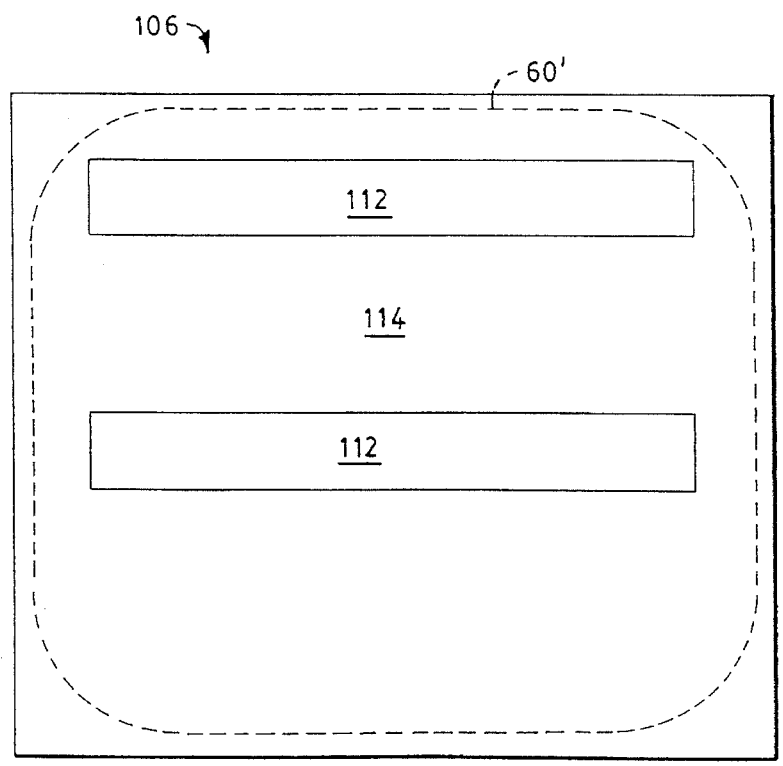
FIG. 7B is a front view of a one dimensional aperture mask according to the teachings of this invention as seen along line 7—7 in FIG. 6.
Figure 8A:
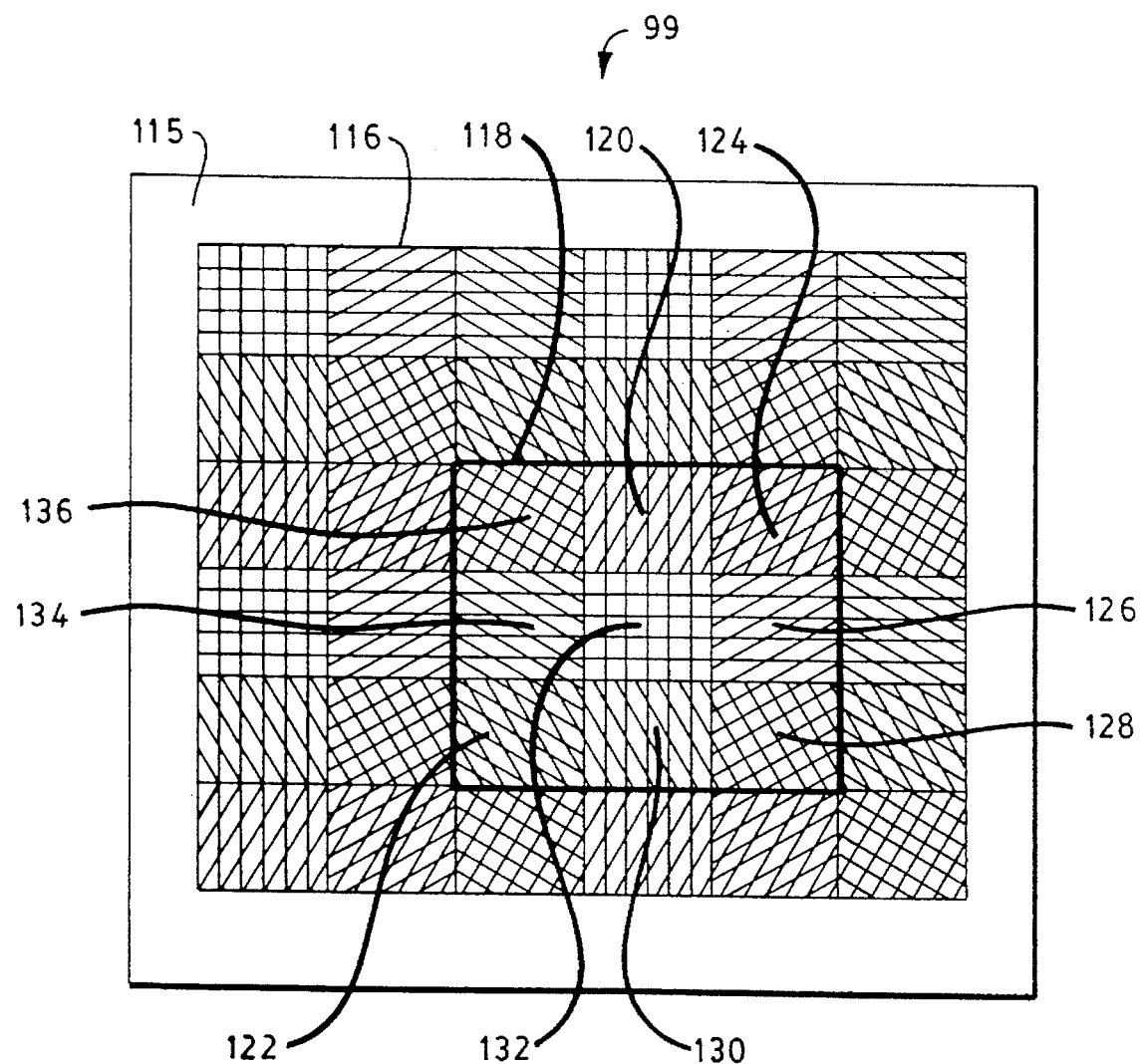
FIG. 8A is a front view of a diffraction mask that employs a two dimensional diffraction grid as seen along line 8—8 in FIG. 6.
Figure 8B:
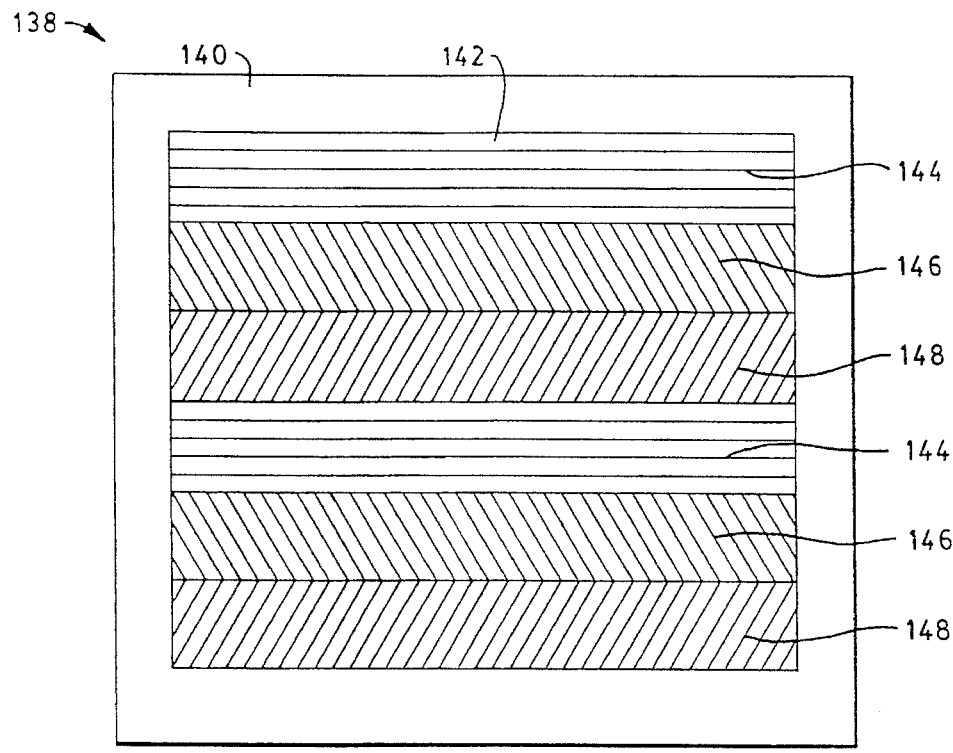
FIG. 8B is a front view of an alternative diffraction mask that employs a one dimensional diffraction grid as seen along line 8—8 in FIG. 6.

FIGS. 7A and 7B disclose examples of the types of aperture mask 94 that can be employed in the PD&C apparatus 92 shown in FIG. 6. Aperture mask 104 in FIG. 7A is employed in conjunction with a two dimensional diffraction grid 99 (FIG. 8A) while aperture mask 106 in FIG. 7B is employed in conjunction with a one dimensional diffraction grid 138 (FIG. 8B). The purpose of these aperture masks 104, 106 is to provide correctly sized patterned light beams to a plurality of correct locations on the diffraction grid. The aperture mask 104 operates to provide a patterned light beam to a specific one of the composite diffraction grating patterns in each cell 118 in the diffraction grid 116 of FIG. 8A at any one time. In a like manner, aperture mask 106 provides a patterned light beam to several of the diffraction gratings of a specific pattern in the diffraction grid 142 (FIG. 8B). These aperture masks 104 and 106 can be fabricated out of several different types of materials depending on the need. If low cost is of primary concern, a polyester photographic film that has the apertures exposed and developed therein is preferred while, if precisely located and sized apertures in the aperture mask are required, chrome on glass is preferred.

In FIG. 7A, the two dimensional aperture mask 104 is comprised of a light blocking region 110 which is larger than the diameter of the light beam 60' produced by the light source 58' (FIG. 6). The light blocking region 110 itself has a plurality of spaced apart apertures 108 disposed therein for the transmission of patterned light beams to the diffraction mask 99 (FIG. 8A). Each aperture 108 is disposed in the aperture mask 104 so as to correspond with a specific composite diffraction grating pattern such as 132 in each cell 118 in the diffraction grid 116 (FIG. 8A). Moreover, each aperture 108 in the aperture mask 104 is dimensioned to produce a light beam on the diffraction grid having approximately the dimensions of the specific composite diffraction grating pattern 132 (FIG. 8A).

The entire aperture mask 104 is aligned with the underlying diffraction mask 98 (FIG. 6) so that each aperture 108 is aligned with a specific composite diffraction grating pattern in each cell 118 in the underlying diffraction grid 99 of FIG. 8A so as to provide correct sized patterned light beams to these aligned composite diffraction grating patterns in the underlying diffraction grid. As the light beam 60' (FIG. 7A) strikes the aperture mask 104, a portion of the light beam 60' (FIG. 7A) will pass though the apertures 108 and be diffracted by the same specific composite diffraction grating patterns (FIG. 8A) in the diffraction mask 99. A plurality of diffracted beams 102 (FIG. 6) are produced therefrom and each of these diffracted beams 102 contains the same diffraction pattern therein. These individual diffracted beams 102 are reflected onto the sensor 66' (FIG. 6) and the intensities of the individual diffracted beams 102 are effectively summed to produce the resulting diffraction pattern 86, 88 (FIG. 4). This approach allows no individual diffracted beam to overwhelmingly determine the resulting diffraction pattern 86, 88 (FIG. 4). Accordingly, inaccuracies in individual diffracted beams, for example, due to dust particles in the diffracted beam's path and/or on the diffraction grid itself, will not adversely effect the resulting diffraction pattern produced. The aperture mask 104 and the light source 58' or the diffraction mask 99 and the image recording medium 100 then move horizontally and vertically as discussed in conjunction with FIG. 6 so as to expose all the pixels or pels in the image recording medium 100.

In FIG. 7B, the one dimensional aperture mask 106 comprises a light blocking region 114 wherein the region 114 is larger than the diameter of the light beam 60' produced by the light source 58' (FIG. 6). The light blocking region 114 itself has a plurality of spaced apart elongated apertures 112 disposed therein for the transmission of the patterned light beams to the diffraction mask 138 (FIG. 8B). Each of these elongated apertures 112 is substantially longer than wide and as wide as necessary to emit a light beam of approximately the same width as the diffraction grating pattern to the diffraction mask 106. Each region 114 disposed between adjacent elongated apertures 112 is substantially as wide as the width dimension of either two, five, or eight adjacent diffraction grating patterns. The elongated apertures 112 are aligned with a specific repeating diffraction grating pattern in the underlying diffraction grid 142 (FIG. 8B) so as to provide correct sized patterned light beams onto the corresponding repeating diffraction grating patterns in the underlying diffraction grid. The aperture mask 106 operates like the aperture mask 104 discussed above in conjunction with FIG. 7A, except that the elongated apertures 112 of the aperture mask 106 are aligned with individual diffraction grating patterns rather than, as in FIG. 7A, with individual composite diffraction grating patterns. Moreover, it should also be obvious to one skilled in this art that, when rotated by ninety degrees, the aperture mask 106 can be employed with a one dimensional diffraction grid 16 of the type shown in FIG. 1B.

Figure 8C:
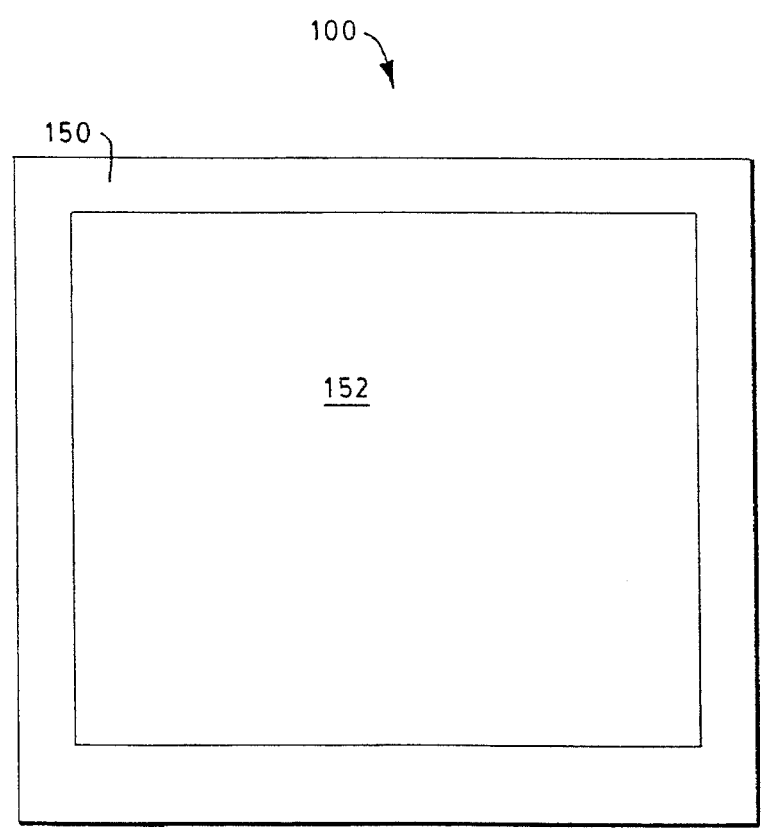
FIG. 8C is a front view of the image recording medium as seen along line 8—8 in FIG. 6.

FIGS. 8A and 8B disclose examples of the types of diffraction masks 99 and 138 that can be employed in the PD&C apparatus 92 shown in FIG. 6. Specifically, the diffraction mask 99 in FIG. 8A has a border region 115 which surrounds a two dimensional diffraction grid 116 while the diffraction mask 138 in FIG. 8B also has a border region 140 which surrounds a one dimensional diffraction mask 142. The diffraction mask 99 in FIG. 8A is employed in conjunction with the aperture mask 104 shown in FIG. 7A while the diffraction mask 138 in FIG. 8B is employed in conjunction with the aperture mask 106 shown in FIG. 7B. The size and shape of the diffraction masks 99 and 138 correspond to the size and shape of the image recording medium 100 shown in FIG. 8C. That is, the size and shape of the diffraction grids 116 and 142 correspond to the size and the shape of an image recording layer 152 in FIG. 8C while the size and the shape of the borders 115 and 140 around diffraction grids 116 and 142 also correspond to the size and shape of a border 150 around the image recording layer 152 in FIG. 8C. The purpose of these diffraction masks 99 and 138 is to provide a one to one correspondence between the image recording layer 152 (FIG. 8C) and the respective diffraction grid 116 and 142. In FIGS. 8A and 8B, the fine pitch of the diffraction grids 116 and 142 are typically uniform throughout the entire diffraction grid. The coarse pitch of the diffraction grid 142 in FIG. 8B is determined in the same method as the coarse pitch discussed in FIGS. 1A and 1B while the coarse pitch of the diffraction grid 116 in FIG. 8A is determined in the same method as the coarse pitch in FIG. 1C. The coarse pitch of the diffraction grids 116 and 142 is in the range between 50 and 150 microns while the individual straight and parallel lines that make each different diffraction grating pattern are between 1 and 5 microns wide and have a fine pitch of between 2 and 10 microns. Either diffraction mask 99 and 138 can be fabricated out of either a thin glass, plastic, aluminum, nickel plate or the like and the diffraction grid can be either etched, embossed, photographed in phase or amplitude, or coined onto or into the mask.

In FIG. 8A, the diffraction mask 99 is integrally mounted to the PD&C apparatus 92 and has a two dimensional diffraction grid 116 disposed thereon which is similar to the one described in FIG. 1C. This two dimensional diffraction grid 116 is comprised of a first repeating plurality of different diffraction grating patterns that make up a one dimensional diffraction grid disposed in an overlapping relationship with respect to a second repeating plurality of different diffraction grating patterns that make up a second one dimensional diffraction grid. Like the two dimensional diffraction grid described in FIG. 1C, this diffraction grid 116 is comprised of a plurality of square shaped cells 118 arranged in a side by side relationship with respect to one another. Each cell 118 is comprised of a plurality of different composite diffraction grating patterns wherein each composite diffraction grating pattern is defined as the intersection of a diffraction grating pattern from the first repeating plurality and a diffraction grating pattern from the second repeating plurality. As shown in FIG. 8A, there are nine different composite diffraction patterns 120, 122, 124, 126, 128, 130, 132, 134 and 136, respectively, that are disposed in each cell 118. These nine different composite diffraction patterns are continuously repeated in adjacent cells as discussed above so as to make up the diffraction grid 116.

In FIG. 8B, the diffraction mask 138 is integrally mounted to the PD&C apparatus 92 and has a one dimensional diffraction grid 142 disposed thereon which is similar to the one described in FIG. 1A. The one dimensional diffraction grid 142 is comprised of a repeating plurality of three different diffraction grating patterns 144, 146, and 148, respectively, that are arranged in a side by side relationship with respect to each other. Like the one dimensional diffraction grid described in FIG. 1A, the equidistant, parallel, and straight lines that make up each diffraction grating pattern are rotated, in adjacent diffraction grating patterns, by approximately 30 or 60 degrees with respect to each other.

Figure 9:
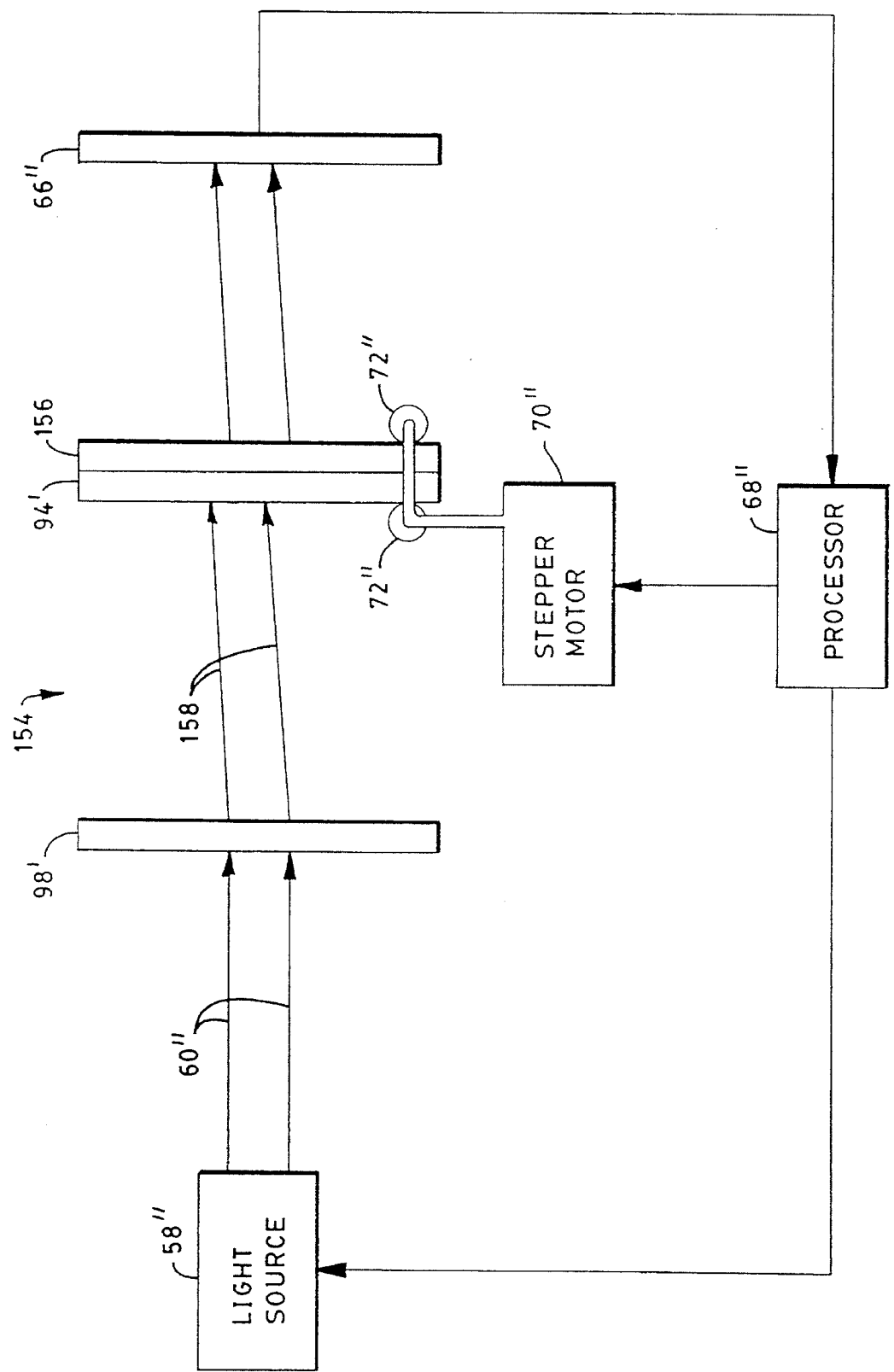
FIG. 9 is a third PD&C apparatus according to the teachings of this invention.

Referring now to FIG. 9 where like numerals designate previously described elements in FIG. 6, a third embodiment of a PD&C apparatus 154 is disclosed that employs a diffraction grid which is integrally attached to the PD&C apparatus 154. Unlike the PD&C apparatus 92 in FIG. 6, the diffracted beams of this PD&C apparatus 154 diffract through, rather than reflect from, an image recording medium 156. This occurs because the image recording medium 156 is a transparent medium, such as a slide, rather than a reflective medium such as an instant print photograph. Thus, unlike the PD&C apparatus 92 in FIG. 6, the sensor 66" of the PD&C apparatus 154 is disposed behind, rather than in front of, the image recording medium 156. Specifically, in this PD&C apparatus, a light source 58" produces a light beam 60" that travels through a diffraction mask 98' which produces a diffracted beam 158. A portion of this diffracted beam 144 is reflected and/or absorbed by the mask portion of the aperture mask 94' while another portion of the diffracted beam passes through the aperture and onto the image recording medium 156. The image recording medium 156, in this case, a transparent slide, transmits the diffracted beam 158 onto the sensor 66" which transmits the information contained in the diffracted beam 158, namely, the position of the light beam 60" on the aperture mask 94', to the processor 68". The aperture mask 94' is disposed adjacent to or a Talbot distance away from the diffraction mask 98' so as to take advantage of the self-imaging property of the Talbot effect. The processor 68" controls a stepper motor 70" which controls the rollers 72" which engage the borders (not shown) of the transparent slide 156 and which moves the slide 156 vertically. As discussed in conjunction with FIG. 6, the processor 68" also controls the horizontal movement of the diffraction mask 98' relative to the aperture mask 94'.

The discussion to this point has been directed towards a one-third duty cycle mask. FIG. 10 illustrates a diffractive scale which includes three different diffractive grating patterns as viewed through a matched one-third duty cycle mask. This arrangement is optimum for some applications, but may not be for others, depending on specific system parameters. The mask shown directly beneath the diffractive scale is on for the first third of a cycle then off for the next two-thirds of the cycle. The diffractive scale of FIG. 10 shows two full cycles. Waveform A represents photo currents induced in detectors positioned to capture the light from the horizontal ruling of the diffractive scale; waveform B represents photo currents induced from the upper left to lower right ruling of the diffractive scale; and waveform C represents photo currents induced from the lower left to the upper right ruling. The scale, the mask and all the waveforms of FIG. 10 each have the same periodicity.

As the mask moves from left to right, the portion of the waveforms directly below the center of the opening in the mask show the appropriate value for each signal at the particular relative position of the mask and scale. The dashed vertical line indicates the value in each waveform that corresponds to the illustrated alignment, e.g., the opening in the mask centered on the phase of the scale with a horizontal ruling.

For the ideal case of FIG. 10, the signals A, B and C in each channel rise linearly for one third of the cycle as the mask uncovers the corresponding ruling. The signal peaks when the opening in the mask is coincident with the appropriate ruling, e.g., signal A is at its peak for the alignment shown. The signal then falls for the first third of a cycle as the mask covers the corresponding ruling, and then remains at zero for the next one third of a cycle.

The remaining six waveforms A–B, A>B, B–C, B>C, C–A and C>A are derived from A, B and C. A–B, B–C, and C–A are analog waveforms representing the differences between pairs of detector signals. A>B, B>C, and C>A are digital waveforms indicating the stronger signal of each pair. For instance if the A>B signal is represented as a logical high, then A has a greater absolute value than B. On the contrary, if the A>B signal is represented as a logical low, i.e. A ≯ B, then A does not have a greater absolute value than B.

The difference signals A–B, B–C and C–A are inherently asymmetric. The difference signals decrease at one rate for the first third of each cycle when both component signals are changing, then the difference signals increase for the next two-thirds of each cycle when only one component signal changes.

In digital applications, problems occur with the asymmetry of the difference signals. For a given amount of noise, the positive transition of the A>B signal is twice as uncertain as the negative transition because of the lower slope of the A–B signal near the positive transition. This difference in uncertainty of the two transitions is indicated by the lower to higher, i.e. positive, transition of A>B in FIG. 10.

Figure 13A:
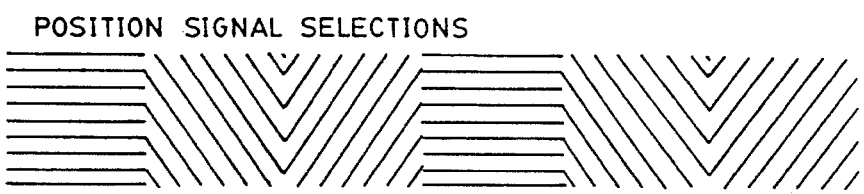
FIG. 13 graphically displays position signal selections for various waveforms of duty cycles.
Figure 13B:
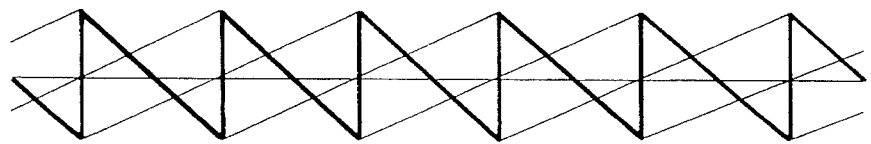
Figure 13C:
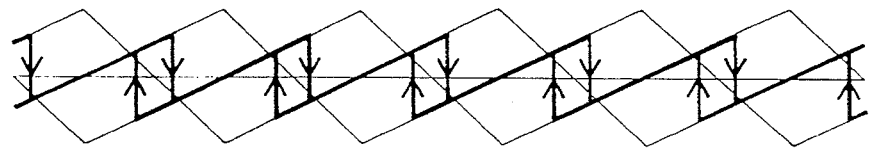

In analog applications, continuous positional information is required. Use of a single difference signal, e.g. A–B, is inadequate. The direction of movement from the peak of the signal cannot be determined since the difference signal decreases in both directions (see FIG. 10). Patching together the steep slope portions of the three difference signals to create the waveform shown by the heavy dark line of FIG. 13(b), leads to the same problem. The shallow sloped waveform of FIG. 13(c) avoids the above problem by using one difference signal until it approaches a peak, then switching to the channel with a signal near zero. (The shallow sloped waveform shown creates a hysteretic path which avoids thrashing between signals near the switching points.)

However, the shallow sloped waveform approach is vulnerable to both additive and multiplicative noise. Using the shallow slope doubles the effect of additive noise. Multiplicative noise has the least effect near zero crossings and the three best zero crossings are ignored.

Figure 13D:
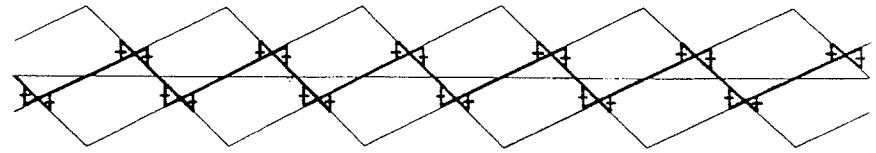

FIG. 13(d) is a one-third duty cycle waveform which mixes steep and shallow slopes to extract the best noise performance. Unfortunately, this one-third duty cycle waveform has the disadvantage of gain switching at every change in signal channel.

Deviations from exactly one-third duty cycle aggravate the problems described above. A duty cycle less than one-third, for example the one-quarter duty cycle waveform of FIG. 11, includes deadbands at the center of each phase of the diffractive scale where none of the signals change, resulting in uncertainty in the positive transitions and no fine position information in these vicinities.

Figure 11A:
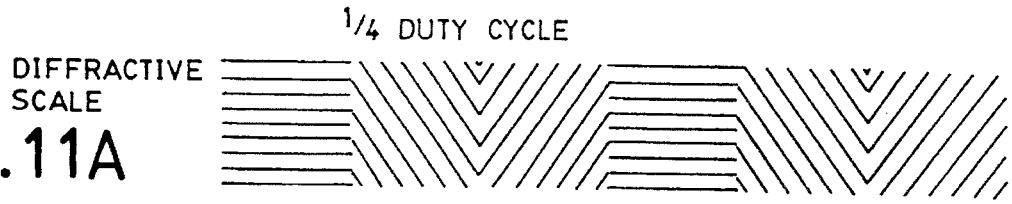
FIG. 11 graphically displays a one quarter duty cycle of the mask.
Figure 12A:
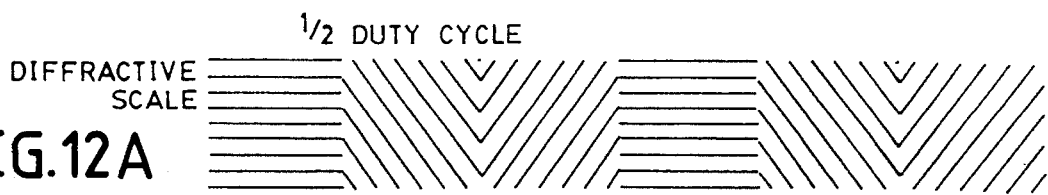
FIG. 12 graphically displays a one half duty cycle of the mask.

FIG. 12 shows the diffractive scale, a one-half duty cycle mask and related signals as previously described. The photo currents change with the same slopes as in FIG. 10. The wide aperture causes a deadband in each of the component signals A, B and C as shown in FIG. 11. However, the other two component signals are changing while one component signal is deadbanded, so positional information remains available.

Figure 13E:
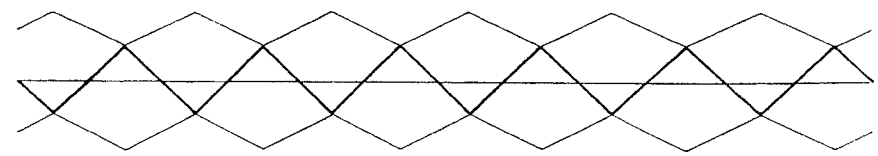

The difference signals A–B, B–C and C–A of FIG. 12 show that positional information is available at any time. Since the difference signals cross zero with the higher of the two slopes of the difference signals of FIG. 10, both the positive and negative transitions are equally sharp and immune to noise. The less desirable half slope is relegated to the region near the peak, which should be avoided to prevent positional ambiguity. FIG. 13(e) shows high sloped regions stitched together to form a continuous, reliable position signal designated by a dark line.

If the duty cycle varies from exactly one-half, the difference signals become asymmetric, but they continue to cross zero at the steeper slope and can be stitched together to form a robust servo system.

It should also be understood that each PD&C apparatus discussed above can also operate with a pilot or reference beam. If such a pilot or reference beam is employed in such a PD&C apparatus, the PD&C apparatus operates as discussed above except that now the diffracted beam produced by the pilot or reference beam, rather than the writing beam itself, provides the positional information to the processor regarding the positioning of the writing beam at the next location. The use of such a pilot or reference beam is particularly advantageous when dealing with aperture constraints on the writing optical system.

Moreover, although the discussions above have been limited to PD&C apparatus for use in conjunction with an electronic printing apparatus, it should also be obvious to one skilled in the art that this invention is not so limited. This invention functions equally well as a general purpose stand alone linear or rotary encoder.

Other embodiments of the invention including additions, subtractions, deletions, and other modifications of the preferred disclosed embodiments of the invention will be obvious to those skilled in the art and are within the scope of the following claims.

What is claimed is:

1. An image recording medium for use with an electronic image printing apparatus of the type having a light beam that can be scanned to produce a two dimensional image exposure on the image recording medium, the image recording medium comprising a light sensitive image recording layer and a plurality of different diffraction grating patterns disposed in an adjacent relationship with each other so as to form a diffraction grid disposed in a corresponding relationship with at least a portion of the light sensitive image recording layer so that when the light beam of the electronic image printing apparatus is radiated onto the diffraction grid at least a portion of the light beam is diffracted from the grid into a diffracted beam which is representative of the position of the light beam on the diffraction grid.

2. The image recording medium of claim 1 wherein the diffraction grid is comprised of a repeating plurality of three different diffraction grating patterns arranged in side by side relationship with respect to each other in at least one row or column disposed in a corresponding relationship with the face of the light sensitive image recording layer.

3. The image recording medium of claim 2 wherein any two diffraction grating patterns are rotated approximately 30 or 60 degrees with respect to one another.

4. The image recording medium of claim 1 wherein the diffraction grid is comprised of a first repeating plurality of different diffraction grating patterns disposed in an overlapping relationship with respect to a second repeating plurality of different diffraction grating patterns so as to define a repeating plurality of cells arranged in a side by side relationship with each other, and each cell comprised of a plurality of different composite diffraction grating patterns wherein each composite diffraction grating pattern is defined as an intersection of a diffraction grating pattern from the first repeating plurality and a diffraction grating pattern from the second repeating plurality.

5. The image recording medium of claim 1 wherein each diffraction grating pattern is comprised of a plurality of equidistant, parallel, and straight lines.

6. The image recording medium of claim 1 wherein the image recording layer of the image recording medium is selected from the group consisting of a transmissive medium which transmits the light beam through the image recording medium, a reflective medium which reflects the light beam away from the image recording medium, or a partially reflective and partially transmissive medium which both transmits and reflects the light beam through and away from the image recording medium respectively.

7. Apparatus for determining the position of a scanning light beam on a two dimensional surface, the apparatus comprising:
   a) a diffraction mask having a plurality of different diffraction grating patterns disposed in an adjacent relationship with respect to each other so as to form a diffraction grid disposed in a corresponding relationship with at least a portion of the surface to be scanned;
   b) a light source for producing a light beam, the light beam being radiated onto the diffraction mask and diffracted therefrom into a diffracted beam which is representative of the position of the light beam on the diffraction grid;
   c) means for effecting the scanning of the light source relative to the surface to be scanned; and
   d) sensing means for detecting the diffracted beam to produce a corresponding signal indicative of the light beam position on the diffraction grid.

8. The apparatus of claim 7 wherein each diffraction grating pattern is comprised of a plurality of equidistant, parallel, and straight lines, and wherein the center to center spacing of adjacent parallel lines defines a fine pitch of the diffraction grid.

9. The apparatus of claim 7 wherein any two adjacent diffraction grating patterns are rotated approximately 30 or 60 degrees with respect to one another.

10. The apparatus of claim 8 wherein the diffraction grid is comprised of a repeating plurality of three different diffraction grating patterns arranged in side by side relationship with respect to each other in at least one row or column disposed in a corresponding relationship with the face of the surface to be scanned and wherein any three adjacent diffraction grading patterns define a coarse pitch of the diffraction grid.

11. The apparatus of claim 10 wherein the diameter of the light beam encompasses a distance on the diffraction grid represented by at least twice the fine pitch of the diffraction grid but less than ten times the coarse pitch of the diffraction grid.

12. The apparatus of claim 10 further comprising an aperture mask in optical alignment with the diffraction mask, the aperture mask being divided into a plurality of spaced apart elongated apertures for the transmission of a patterned light beam, each aperture being substantially longer than wide and approximately as wide as necessary to produce a light beam on the diffraction grid having approximately the width of a diffraction grating pattern, each space between adjacent apertures defining a mask surface which inhibits the transmission of the light beam, and each mask surface being approximately as wide as the dimensions of either two, five, or eight adjacent diffraction grating patterns.

13. The apparatus of claim 12 wherein the diffraction mask is disposed in registration with respect to the surface to be scanned, the aperture mask is disposed between the light source and the diffraction mask, and wherein the aperture mask is disposed an integer multiple of a Talbot distance away from the diffraction mask.

14. The apparatus of claim 12 wherein the aperture mask is disposed in registration with respect to the surface to be scanned, the diffraction mask is disposed between the light source and the aperture mask, and wherein the aperture mask is disposed an integer multiple of a Talbot distance away from the diffraction mask.

15. The apparatus of claim 8 wherein the diffraction grid is comprised of a first repeating plurality of different diffraction grating patterns disposed in an overlapping relationship with respect to a second repeating plurality of different diffraction grating patterns so as to define a repeating plurality of cells arranged in a side by side relationship with each other, each cell comprised of a plurality of different composite diffraction grating patterns wherein each composite diffraction grating pattern is defined as an intersection of a diffraction grating pattern from the first repeating plurality and a diffraction grating pattern from the second repeating plurality, and the longest side dimension of any cell defining a coarse pitch of the diffraction grid.

16. The apparatus of claim 15 wherein the diameter of the light beam encompasses a distance on the diffraction grid represented by at least twice the fine pitch of the diffraction grid but less than ten times the coarse pitch of the diffraction grid.

17. The apparatus of claim 15 further comprising an aperture mask in optical alignment with the diffraction mask, the aperture mask being divided into a plurality of spaced apart apertures for the transmission of a patterned light beam, each aperture in the aperture mask corresponding to a specific composite diffraction grating pattern in each cell, and each aperture having approximately the dimensions necessary to produce a light beam on the diffraction grid that has approximately the dimensions of the specific composite diffraction grating pattern.

18. The apparatus of claim 17 wherein the diffraction mask is disposed in registration with respect to the surface to be scanned, the aperture mask is disposed between the light source and the diffraction mask, and wherein the aperture mask is disposed an integer multiple of a Talbot distance away from the diffraction mask.

19. The apparatus of claim 17 wherein the aperture mask is disposed in registration with respect to the surface to be scanned, the diffraction mask is disposed between the light source and the aperture mask, and wherein the aperture mask is disposed an integer multiple of a Talbot distance away from the diffraction mask.

20. The apparatus of claim 10 further comprising an aperture mask in optical alignment with the diffraction mask, the aperture mask being divided into a plurality of spaced apart elongated apertures for the transmission of a patterned light beam, each aperture being substantially longer than wide and approximately as wide as one-half the coarse pitch of the diffraction grid, each space between adjacent apertures defining a mask surface which inhibits the transmission of the light beam, and each said mask surface being as wide as one-half the coarse pitch of the diffraction grid.

21. The apparatus of claim 20 wherein the diffraction mask is disposed in registration with respect to the surface to be scanned, the aperture mask is disposed between the light source and the diffraction mask, and wherein the aperture mask is disposed an integer multiple of a Talbot distance away from the diffraction mask.

22. The apparatus of claim 20 wherein the aperture mask is disposed in registration with respect to the surface to be scanned, the diffraction mask is disposed between the light source and the aperture mask, and wherein the aperture mask is disposed an integer multiple of a Talbot distance away from the diffraction mask.

23. In an electronic image printing apparatus of the type for exposing an image recording medium by scanning an image exposing light beam across the face of the image recording medium wherein the image recording medium comprises a light sensitive image recording layer, an improvement comprising:
   a) a diffraction mask having a plurality of different diffraction grating patterns disposed in adjacent relationship with each other so as to form a diffraction grid disposed in a corresponding relationship with at least a portion of the light sensitive image recording layer so that when the light beam of the electronic image printing apparatus is radiated onto the diffraction grid at least a portion of the light beam is then diffracted from the grid into a diffracted beam which is representative of the position of the light beam on the diffraction grid; and
   b) sensing means for detecting the diffracted beam to produce a corresponding control signal indicative of the light beam position on the diffraction grid.

24. The improvement of claim 23 wherein each diffraction grating pattern is comprised of a plurality of equidistant, parallel, and straight lines, and wherein the center to center spacing of adjacent parallel lines defines a fine pitch of the diffraction grid.

25. The improvement of claim 23 wherein any two adjacent diffraction grating patterns are rotated approximately 30 or 60 degrees with respect to one another.

26. The improvement of claim 24 wherein the diffraction grid is comprised of a repeating plurality of three different diffraction grating patterns arranged in side by side relationship with respect to each other in at least one row or column disposed in a corresponding relationship with the face of the light sensitive image recording layer and wherein any three adjacent diffraction grading patterns define a coarse pitch of the diffraction grid.

27. The improvement of claim 26 wherein the diameter of the light beam encompasses a distance on the diffraction grid represented by at least twice the fine pitch of the diffraction grid but less than ten times the coarse pitch of the diffraction grid.

28. The improvement of claim 26 further comprising an aperture mask in optical alignment with the diffraction mask, the aperture mask being divided into a plurality of spaced apart elongated apertures for the transmission of a patterned light beam, each aperture being substantially longer than wide and approximately as wide as necessary to produce a light beam on the diffraction grid having approximately the width of a diffraction grating pattern, each space between adjacent apertures defining a mask surface which inhibits the transmission of the light beam, and each mask surface being approximately as wide as the dimensions of either two, five, or eight adjacent diffraction grating patterns.

29. The improvement of claim 28 wherein the diffraction mask is disposed in registration with respect to the light sensitive image recording layer, the aperture mask is disposed between the light source and the diffraction mask, and wherein the aperture mask is disposed an integer multiple of a Talbot distance away from the diffraction mask.

30. The improvement of claim 28 wherein the aperture mask is disposed in registration with respect to the light sensitive image recording layer, the diffraction mask is disposed between the light source and the aperture mask, and wherein the aperture mask is disposed an integer multiple of a Talbot distance away from the diffraction mask.

31. The improvement of claim 24 wherein the diffraction grid is comprised of a first repeating plurality of different diffraction grating patterns disposed in an overlapping relationship with respect to a second repeating plurality of different diffraction grating patterns so as to define a repeating plurality of cells arranged in a side by side relationship with each other, each cell comprised of a plurality of different composite diffraction grating patterns wherein each composite diffraction grating pattern is defined as an intersection of a diffraction grating pattern from the first repeating plurality and a diffraction grating pattern from the second repeating plurality, and a longest side dimension of any cell defining a coarse pitch of the diffraction grid.

32. The improvement of claim 31 wherein the diameter of the light beam encompasses a distance on the diffraction grid represented by at least twice the fine pitch of the diffraction grid but less than ten times the coarse pitch of the diffraction grid.

33. The improvement of claim 31 further comprising an aperture mask in optical alignment with the diffraction mask, the aperture mask being divided into a plurality of spaced apart apertures for the transmission of a patterned light beam, each aperture in the aperture mask corresponding to a specific composite diffraction grating pattern in each cell, and each aperture having approximately the dimensions necessary to produce a light beam on the diffraction grid that has approximately the dimensions of the specific composite diffraction grating pattern.

34. The improvement of claim 33 wherein the diffraction mask is disposed in registration with respect to the light sensitive image recording layer, the aperture mask is disposed between the light source and the diffraction mask, and wherein the aperture mask is disposed an integer multiple of a Talbot distance away from the diffraction mask.

35. The improvement of claim 33 wherein the aperture mask is disposed in registration with respect to the light sensitive image recording layer, the diffraction mask is disposed between the light source and the aperture mask, and wherein the aperture mask is disposed an integer multiple of a Talbot distance away from the diffraction mask.

36. The improvement of claim 26 further comprising an aperture mask in optical alignment with the diffraction mask, the aperture mask being divided into a plurality of spaced apart elongated apertures for the transmission of a patterned light beam, each aperture being substantially longer than wide and approximately as wide as one-half the coarse pitch of the diffraction grid, each space between adjacent apertures defining a mask surface which inhibits the transmission of the light beam, and each mask surface being as wide as one-half the coarse pitch of the diffraction grid.

37. The improvement of claim 36 wherein the diffraction mask is disposed in registration with respect to the light sensitive image recording layer, the aperture mask is disposed between the light source and the diffraction mask, and wherein the aperture mask is disposed an integer multiple of a Talbot distance away from the diffraction mask.

38. The improvement of claim 36 wherein the aperture mask is disposed in registration with respect to the light sensitive image recording layer, the diffraction mask is disposed between the light source and the aperture mask, and wherein the aperture mask is disposed an integer multiple of a Talbot distance away from the diffraction mask.

39. An electronic image printing apparatus of the type for exposing an image recording medium by scanning an image exposing light beam across the face of the image recording medium wherein the image recording medium comprises a light sensitive image recording layer, the electronic image printing apparatus comprising:

a) a diffraction mask having a plurality of different diffraction grating patterns disposed in an adjacent relationship with respect to each other so as to form a diffraction grid disposed in a corresponding relationship with at least a portion of the image recording layer of the image recording medium;

b) a light source for producing a light beam in response to a signal, the light beam being radiated onto the diffraction mask and diffracting therefrom into a diffracted beam which is representative of the position of the light beam on the diffraction grid;

c) means for effecting the scanning of the light source relative to the diffraction grid; and d) sensing means for detecting the diffracted beam to produce a corresponding control signal indicative of the light beam position on the diffraction grid.

40. The apparatus of claim 39 wherein each diffraction grating pattern is comprised of a plurality of equidistant, parallel, and straight lines, and wherein the center to center spacing of adjacent parallel lines defines a fine pitch of the diffraction grid.

41. The apparatus of claim 39 wherein any two adjacent diffraction grating patterns are rotated approximately 30 or 60 degrees with respect to one another.

42. The apparatus of claim 40 wherein the diffraction grid is comprised of a repeating plurality of three different diffraction grating patterns arranged in side by side relationship with respect to each other in at least one row or column disposed in a corresponding relationship with the face of the light sensitive image recording layer and wherein any three adjacent diffraction grading patterns define a coarse pitch of the diffraction grid.

43. The apparatus of claim 40 wherein the diameter of the light beam encompasses a distance on the diffraction grid represented by at least twice the fine pitch of the diffraction grid but less than ten times the coarse pitch of the diffraction grid.

44. The apparatus of claim 40 further comprising an aperture mask in optical alignment with the diffraction mask, the aperture mask being divided into a plurality of spaced apart elongated apertures for the transmission of a patterned light beam, each aperture being substantially longer than wide and approximately as wide as necessary to produce a light beam on the diffraction grid having approximately the width of a diffraction grating pattern, each space between adjacent apertures defining a mask surface which inhibits the transmission of the light beam, and each mask surface being approximately as wide as the dimensions of either two, five, or eight adjacent diffraction grating patterns.

45. The apparatus of claim 44 wherein the diffraction mask is disposed in registration with respect to the light sensitive image recording layer, the aperture mask is disposed between the light source and the diffraction mask, and wherein the aperture mask is disposed an integer multiple of a Talbot distance away from the diffraction mask.

46. The apparatus of claim 45 wherein the aperture mask is disposed in registration with respect to the light sensitive image recording layer, the diffraction mask is disposed between the light source and the aperture mask, and wherein the aperture mask is disposed an integer multiple of a Talbot distance away from the diffraction mask.

47. The apparatus of claim 42 further comprising an aperture mask in optical alignment with the diffraction mask, the aperture mask being divided into a plurality of spaced apart elongated apertures for the transmission of a patterned light beam, each aperture being substantially longer than wide and approximately as wide as one-half the coarse pitch of the diffraction grid, each space between adjacent apertures defining a mask surface which inhibits the transmission of the light beam, and each mask surface being as wide as one-half the coarse pitch of the diffraction grid.

48. The apparatus of claim 47 wherein the diffraction mask is disposed in registration with respect to the surface to be scanned, the aperture mask is disposed between the light source and the diffraction mask, and wherein the aperture mask is disposed an integer multiple of a Talbot distance away from the diffraction mask.

49. The apparatus of claim 47 wherein the aperture mask is disposed in registration with respect to the surface to be scanned, the diffraction mask is disposed between the light source and the aperture mask, and wherein the aperture mask is disposed an integer multiple of a Talbot distance away from the diffraction mask.

50. The apparatus of claim 40 wherein the diffraction grid is comprised of a first repeating plurality of different diffraction grating patterns disposed in an overlapping relationship with respect to a second repeating plurality of different diffraction grating patterns so as to define a repeating plurality of cells arranged in a side by side relationship with each other, each cell comprised of a plurality of different composite diffraction grating patterns wherein each composite diffraction grating pattern is defined as an intersection of a diffraction grating pattern from the first repeating plurality and a diffraction grating pattern from the second repeating plurality, and a longest side dimension of any cell defining a coarse pitch of the diffraction grid.

51. The apparatus of claim 50 wherein the diameter of the light beam encompasses a distance on the diffraction grid represented by at least twice the fine pitch of the diffraction grid but less than ten times the coarse pitch of the diffraction grid.

52. The apparatus of claim 50 further comprising an aperture mask in optical alignment with the diffraction mask, the aperture mask being divided into a plurality of spaced apart apertures for the transmission of a patterned light beam, each aperture in the aperture mask corresponding to a specific composite diffraction grating pattern in each cell, and each aperture having approximately the same dimensions necessary to produce a light beam on the diffraction grid that has approximately the dimensions of the specific composite diffraction grating pattern.

53. The apparatus of claim 52 wherein the diffraction mask is disposed in registration with respect to the light sensitive image recording layer, the aperture mask is disposed between the light source and the diffraction mask, and wherein the aperture mask is disposed an integer multiple of a Talbot distance away from the diffraction mask.

54. The apparatus of claim 52 wherein the aperture mask is disposed in registration with respect to the light sensitive image recording layer, the diffraction mask is disposed between the light source and the aperture mask, and wherein the aperture mask is disposed an integer multiple of a Talbot distance away from the diffraction mask.

55. The apparatus of claim 42 further comprising an aperture mask in optical alignment with the diffraction mask, the aperture mask being divided into a plurality of spaced apart elongated apertures for the transmission of a patterned light beam, each aperture being substantially longer than wide and approximately as wide as one-half the coarse pitch of the diffraction grid, each space between adjacent apertures defining a mask surface which inhibits the transmission of the light beam, and each mask surface being as wide as one-half the coarse pitch of the diffraction grid.

56. An electronic image printing apparatus of the type for exposing an image recording medium by scanning an image exposing light beam across the face of the image recording medium wherein the image recording medium comprises a light sensitive image recording layer and a plurality of different diffraction grating patterns disposed in adjacent relationship with each other so as to form a diffraction grid disposed in a corresponding relationship with at least a portion of the light sensitive image recording layer, the electronic image printing apparatus comprising:

a) a light source for producing a light beam in response to a signal, the light beam being radiated onto the diffraction grid and diffracting therefrom into a diffracted beam which is representative of the position of the light beam on the diffraction grid;

b) means for effecting the scanning of the light source relative to the diffraction grid; and c) sensing means for detecting the diffracted beam to produce a corresponding control signals indicative of the light beam position on the diffraction grid.

* * * * *